(12) United States Patent
VanDerWege et al.

(10) Patent No.: US 11,473,459 B2
(45) Date of Patent: Oct. 18, 2022

(54) SYSTEMS AND METHODS FOR PROVIDING COMPRESSION RELEASE WITH CONTINUOUS VARIABLE VALVE LIFT

(71) Applicant: Ford Global Technologies, LLC, Dearborn, MI (US)

(72) Inventors: Brad Alan VanDerWege, Plymouth, MI (US); Michael Shelby, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 302 days.

(21) Appl. No.: 16/922,638

(22) Filed: Jul. 7, 2020

(65) Prior Publication Data
US 2022/0010702 A1 Jan. 13, 2022

(51) Int. Cl.
| | |
|---|---|
| *F01L 13/08* | (2006.01) |
| *F02N 11/08* | (2006.01) |
| *F01L 13/00* | (2006.01) |
| *F01L 1/08* | (2006.01) |
| *F01L 9/10* | (2021.01) |

(52) U.S. Cl.
CPC .............. *F01L 13/08* (2013.01); *F01L 1/08* (2013.01); *F01L 9/10* (2021.01); *F01L 13/0042* (2013.01); *F02N 11/0818* (2013.01); *F01L 2800/01* (2013.01); *F02N 2200/061* (2013.01)

(58) Field of Classification Search
CPC ..... F01L 13/08; F01L 1/08; F01L 9/10; F01L 13/0042; F01L 2800/01; F01L 9/11; F01L 13/0015; F01L 9/14; F01L 9/40; F01L 13/06; F01L 2009/408; F01L 2009/4094; F02N 11/0818; F02N 2200/061; F02N 11/0814; F02N 19/004; F02N 2019/008; F02N 19/005; F02N 2200/022; F02N 11/08; F02N 11/0829; F02D 41/06; F02D 2200/503; F02D 13/0207; F02D 13/0226; F02D 13/04; F02D 41/0002; F02D 2013/0292; F02D 2013/0296; F02D 2041/001
See application file for complete search history.

(56) References Cited

U.S. PATENT DOCUMENTS

| | | | |
|---|---|---|---|
| 9,217,339 B2 | 12/2015 | McConville et al. | |
| 10,184,412 B2 | 1/2019 | Edington et al. | |
| 2012/0118251 A1 | 5/2012 | Choi et al. | |
| 2016/0076472 A1* | 3/2016 | Nakamoto | F02D 41/009 123/299 |

* cited by examiner

*Primary Examiner* — Jacob M Amick
*Assistant Examiner* — Charles J Brauch
(74) *Attorney, Agent, or Firm* — Vincent Mastrogiacomo; McCoy Russell LLP

(57) ABSTRACT

Methods and systems are provided for providing compression release during a stop/start event in an engine. In one example, a method includes: responsive to a request for a stop/start event in an engine with a continuously variable valve lift (CVVL) system including a compression release hydraulic valve actuator coupled to a valve of a first cylinder, determining a desired stop position of the engine; and prior to restarting the engine during the stop/start event, adjusting the compression release hydraulic valve actuator to open the valve during a compression stroke of the first cylinder. In this way, an amount of torque used to restart the engine may be reduced.

20 Claims, 9 Drawing Sheets

SYSTEMS AND METHODS FOR PROVIDING COMPRESSION RELEASE WITH CONTINUOUS VARIABLE VALVE LIFT

FIELD

The present description relates generally to methods and systems for controlling a vehicle engine equipped with continuous variable valve lift.

BACKGROUND/SUMMARY

Some vehicle engines may be equipped with a stop/start system configured to shut off during idle conditions, such as when the vehicle comes to a stop while a brake is applied, and then to restart once the brake is released. For example, by stopping the engine rather than idling the engine, fuel consumption may be reduced. Fuel consumption may be further reduced by shutting down the engine during braking and by shutting down the engine when the operator is not requesting torque, such as before the vehicle has come to a stop. When an engine restart is requested in a stop/start vehicle, an electric machine may be used to begin turning the engine before cylinder combustion resumes. The amount of torque used to compress air in the cylinders (e.g., in order to turn the engine) may dictate electric machine sizing for the vehicle. Further, large engines may be difficult to start using belt-driven electric machines because of a smaller belt drive torque capacity relative to other engine and electric machine configurations. As another example, larger shutdown and restart torques produce larger reaction forces on the vehicle, which may reduce usage of the stop/start system in order to reduce noise, vibration, and harshness (NVH).

In one example, the issues described above may be addressed by a method for, responsive to a request for a stop/start event in an engine with a continuously variable valve lift (CVVL) system including a compression release hydraulic valve actuator coupled to a valve of a first cylinder, determining a desired stop position of the engine; and prior to restarting the engine during the stop/start event, adjusting the compression release hydraulic valve actuator to open the valve during a compression stroke of the first cylinder. In this way, an amount of torque used to restart the engine during a stop/start event may be reduced, so that the stop/start system may be used more frequently, a smaller electric machine may be used in the stop/start system, engine off time may be increased, additional regenerative energy may be captured during braking, and NVH during a stop/start event may be reduced. Overall, fuel efficiency may be increased.

As one example, the desired stop position is an engine position in which the first cylinder is in a beginning of a compression stroke. For example, the engine may be stopped at the desired stop position of the engine, so that when the engine restarts, the first cylinder including the compression release hydraulic valve actuator is entering the compression stroke. In order to reduce an amount of torque required to compress the air in the first cylinder during the compression stroke, compression release may be applied via the compression release hydraulic valve actuator. As an example, responsive to a request to restart the engine during the stop/start event, the crankshaft of the engine may be turned by an electric machine (e.g., an electric motor) so that the rotational speed of the crankshaft increases. Responsive to a rotational speed of the crankshaft exceeding a threshold rotational speed, the compression release hydraulic valve actuator may be adjusted so as not to open the valve during the compression stroke of the first cylinder, and combustion may resume. Stated differently, once the engine reaches a threshold speed, compression release may not be applied in order to reduce the amount of torque used to turn the engine, and combustion may resume in the cylinders. For example, hot exhaust gases from combustion may turn the engine, and the electric machine may not turn the engine. Further, the request for the stop/start event may be responsive to an amount of driver-demanded torque decreasing below a threshold torque demand while a battery state of charge (SOC) exceeds a threshold SOC. As another example, the CVVL system may include additional compression release hydraulic valve actuators coupled to valves of additional cylinders of the engine, and reducing the amount of torque used to restart the engine may include, prior to restarting the engine during the stop/start event, adjusting the additional compression release hydraulic valve actuators to open the valves of the additional cylinders during the compression stroke of the corresponding additional cylinder. For example, providing compression release to additional cylinders may further reduce an amount of torque used to restart the engine.

As an example, compression release may be provided to cylinders via adjusting an amount of hydraulic pressure in the compression release hydraulic valve actuator. As a first example, the compression release hydraulic valve actuator includes a cam with a first, high-lift lobe and a second, low-lift lobe, the low-lift lobe positioned to open the valve during the compression stroke of the first cylinder when a hydraulic pressure in the compression release hydraulic valve actuator exceeds a first threshold hydraulic pressure. For example, adjusting the compression release hydraulic valve actuator to open the valve during the compression stroke of the first cylinder includes fully closing a hydraulic control valve to block flow of a hydraulic fluid out of the compression release hydraulic valve actuator (e.g., so that hydraulic pressure in the compression release hydraulic valve actuator increases). As second example, the compression release hydraulic valve actuator includes an accumulator fluidically coupled to a hydraulic cylinder of the valve via an accumulator line with an accumulator valve disposed therein, and wherein adjusting the compression release hydraulic valve actuator to open the valve during the compression stroke of the first cylinder includes increasing hydraulic pressure in the hydraulic cylinder of the valve by opening the accumulator valve. As a third example, the compression release hydraulic valve actuator includes a lift-locking valve fluidically coupled between a hydraulic control valve in a hydraulic supply line to the compression release hydraulic valve actuator and a hydraulic cylinder of the valve, and adjusting the compression release hydraulic valve actuator to open the valve during the compression stroke of the first cylinder includes fully closing the lift-locking valve while the valve is open.

By including a compression release hydraulic valve actuator coupled to a valve of at least one cylinder of an engine, an amount of torque used to restart an engine during a stop/start event may be reduced. Because the amount of torque used to restart the engine during the stop/start event is reduced, an incidence of stop/start events may be increased. For example, an electric machine may be used to restart the engine, the electric machine powered by a battery. Due to the decreased amount of torque used, a threshold battery SOC for a stop/start event may be lower, as less torque from the electric machine is used to restart the engine. Increasing an incidence of stop/start events may reduce overall fuel usage in the vehicle, leading to increased fuel efficiency and reduced vehicle emissions. Further, by decreasing the amount of torque used to restart the engine during the stop/start event, an incidence of NVH issues may be reduced, which may increase customer satisfaction.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
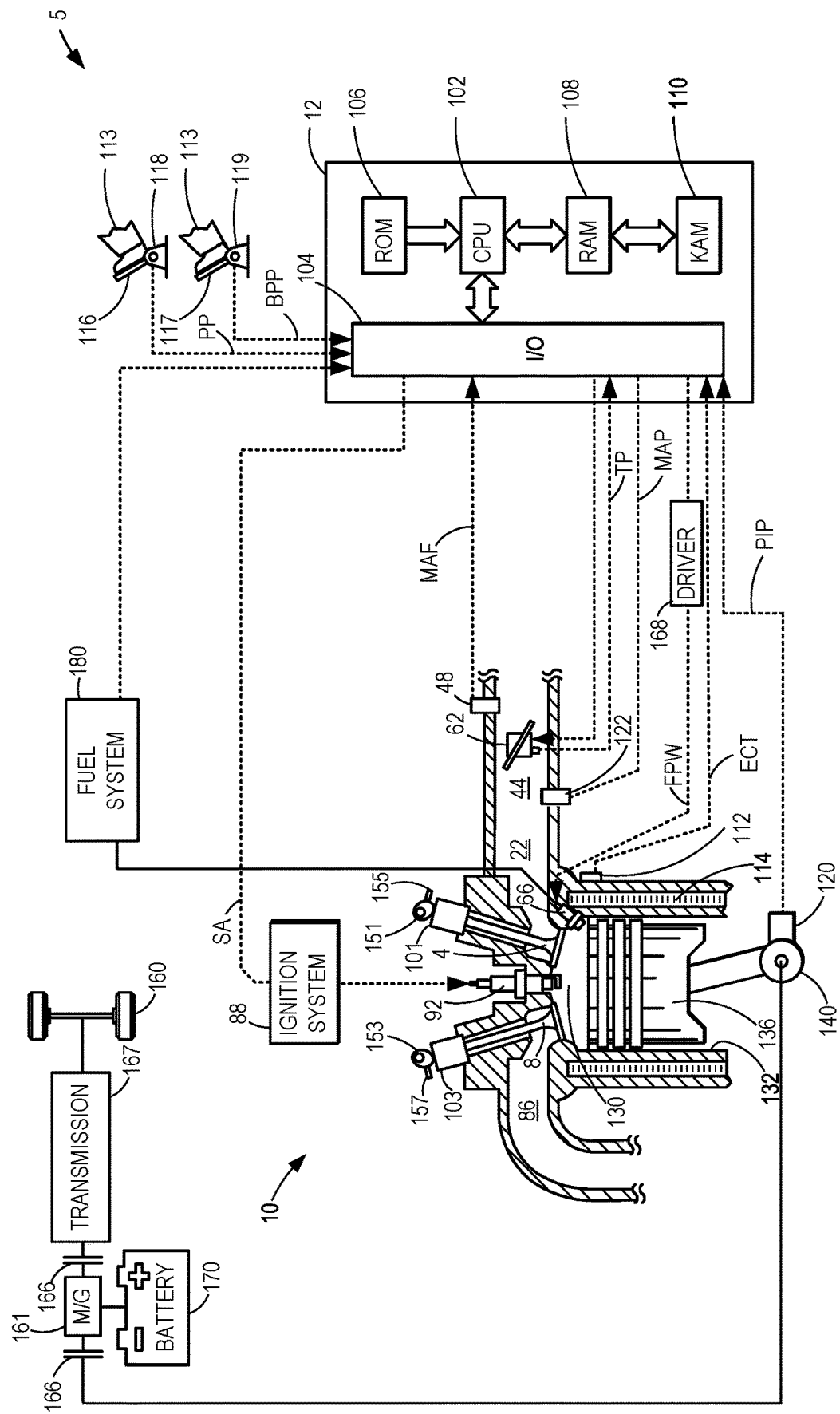
FIG. 1 shows a schematic depiction of a cylinder configuration in an engine system of a vehicle.
Figure 2:
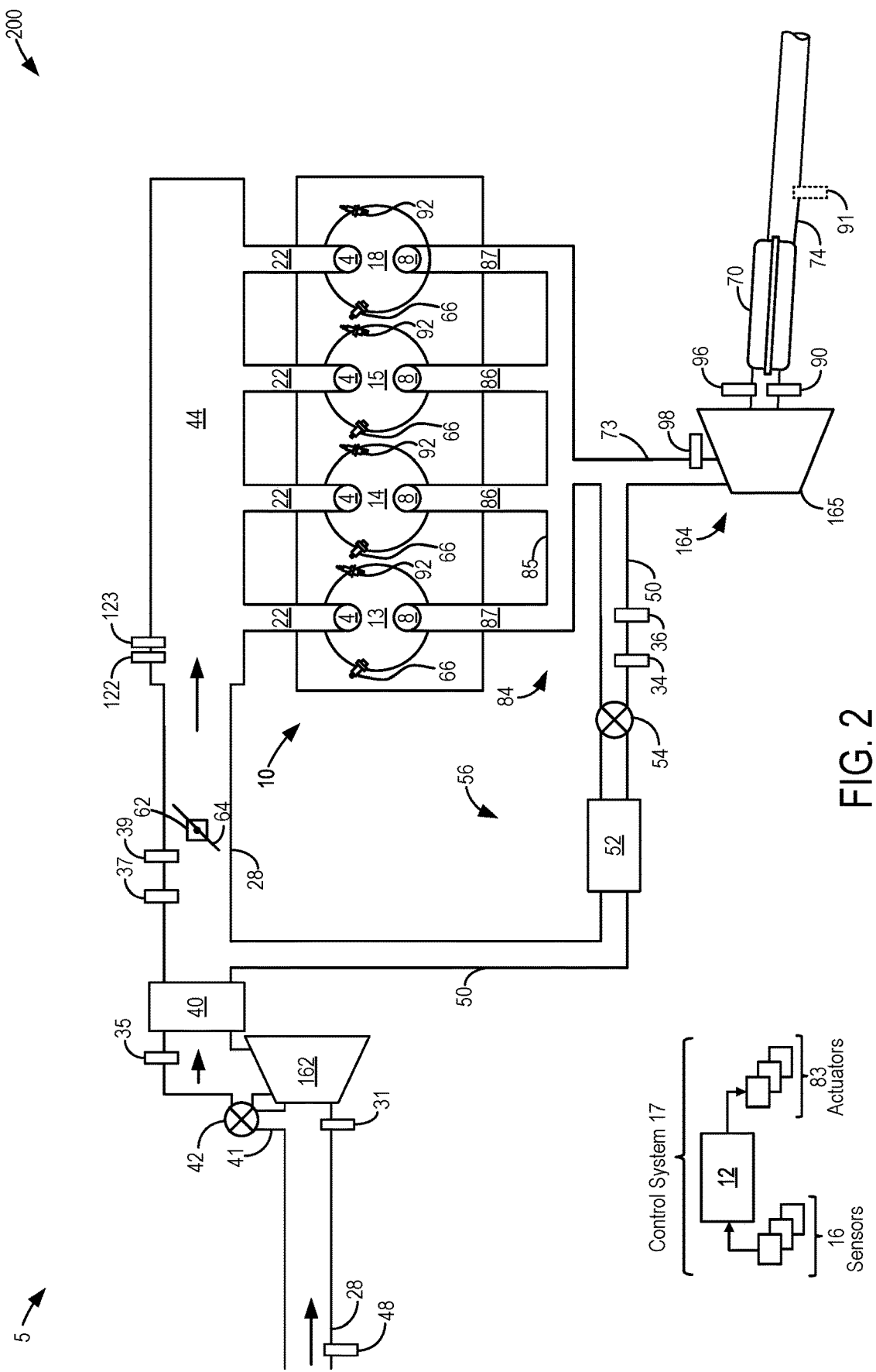
FIG. 2 shows a schematic depiction of an example of an engine system.
Figure 3:
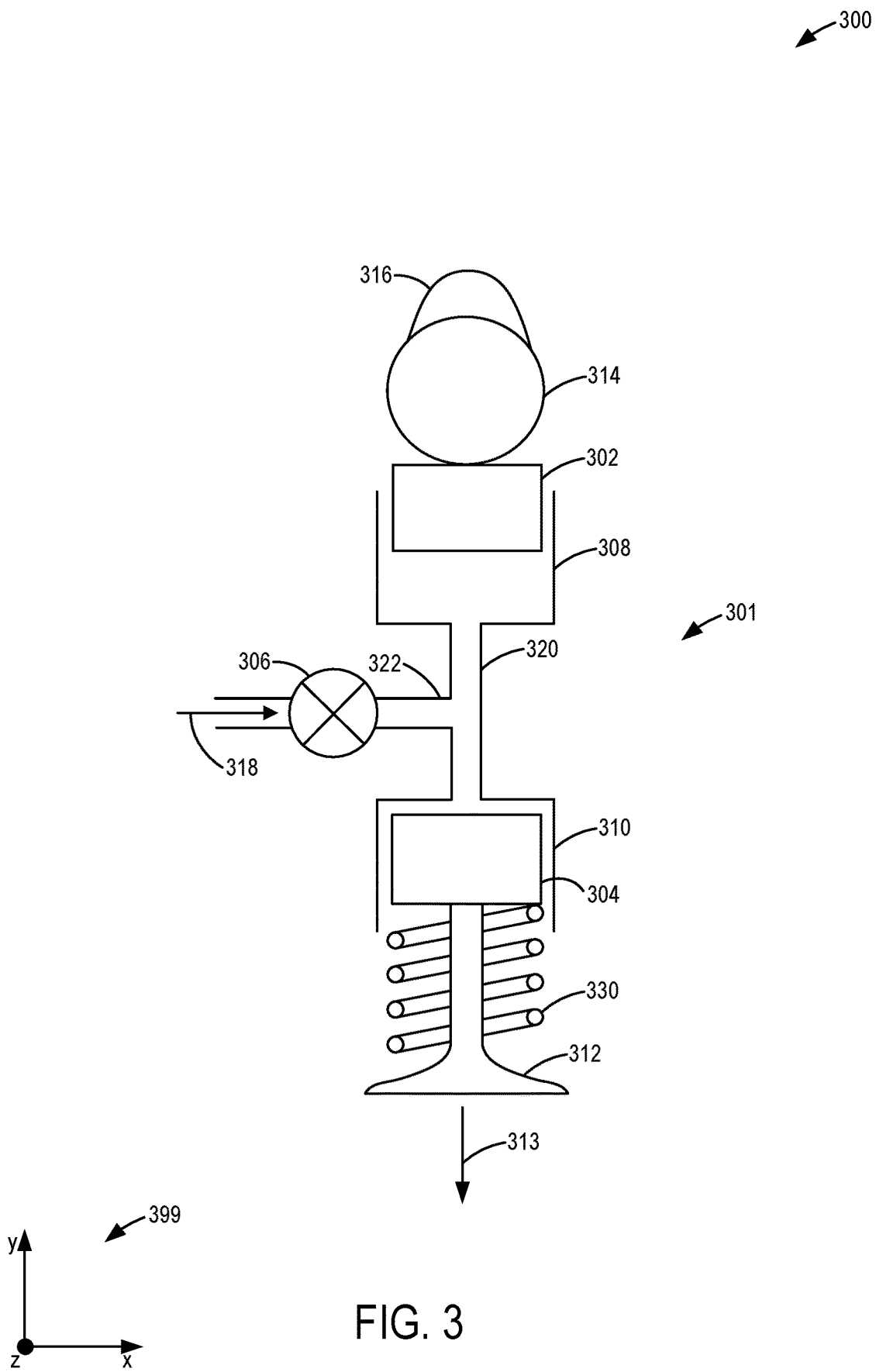
FIG. 3 shows a schematic view of an example hydraulic valve mechanism for an engine.
Figure 4:
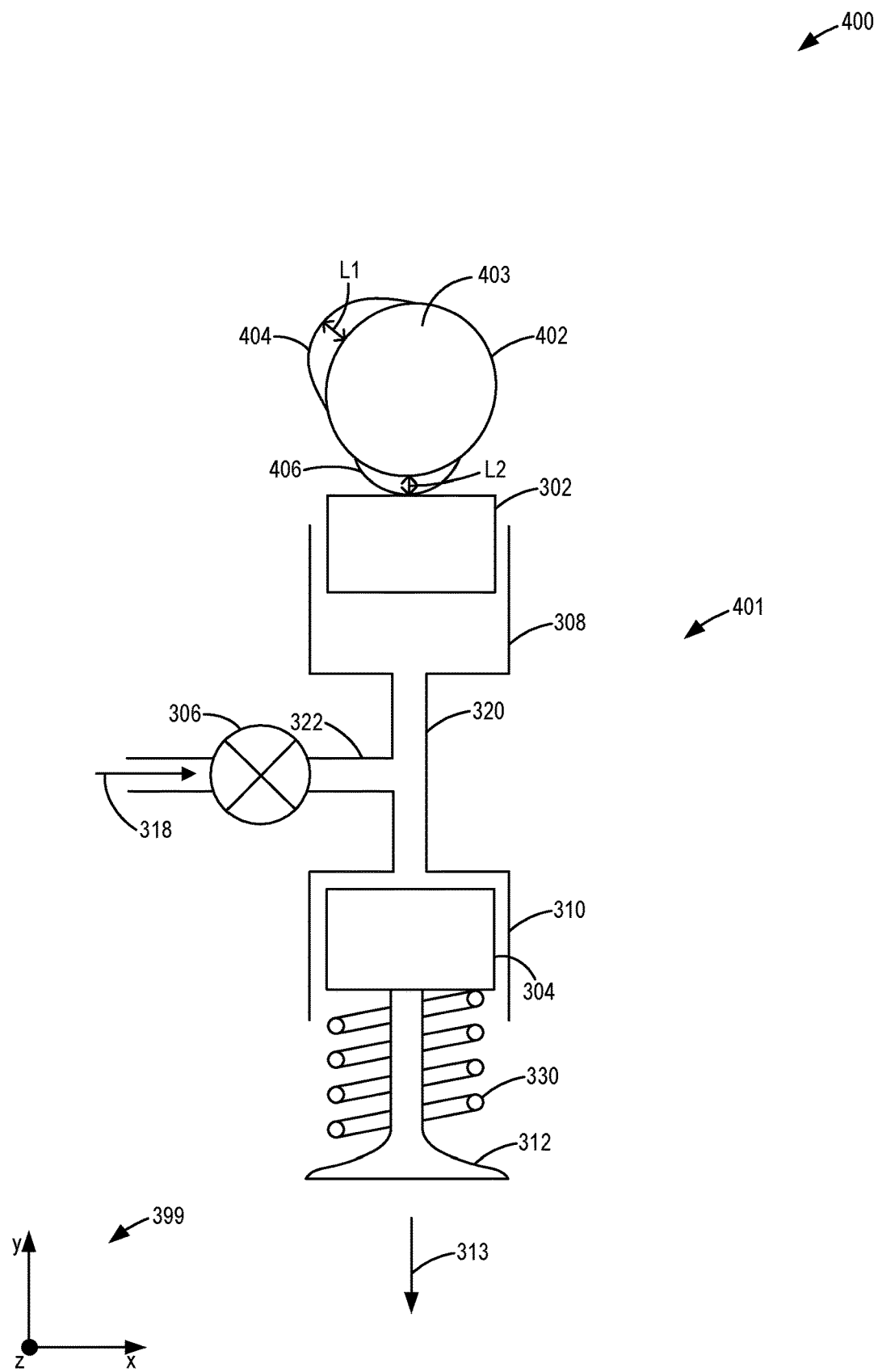
FIG. 4 shows a schematic view of a first example hydraulic valve mechanism with compression release for an engine.
Figure 5:
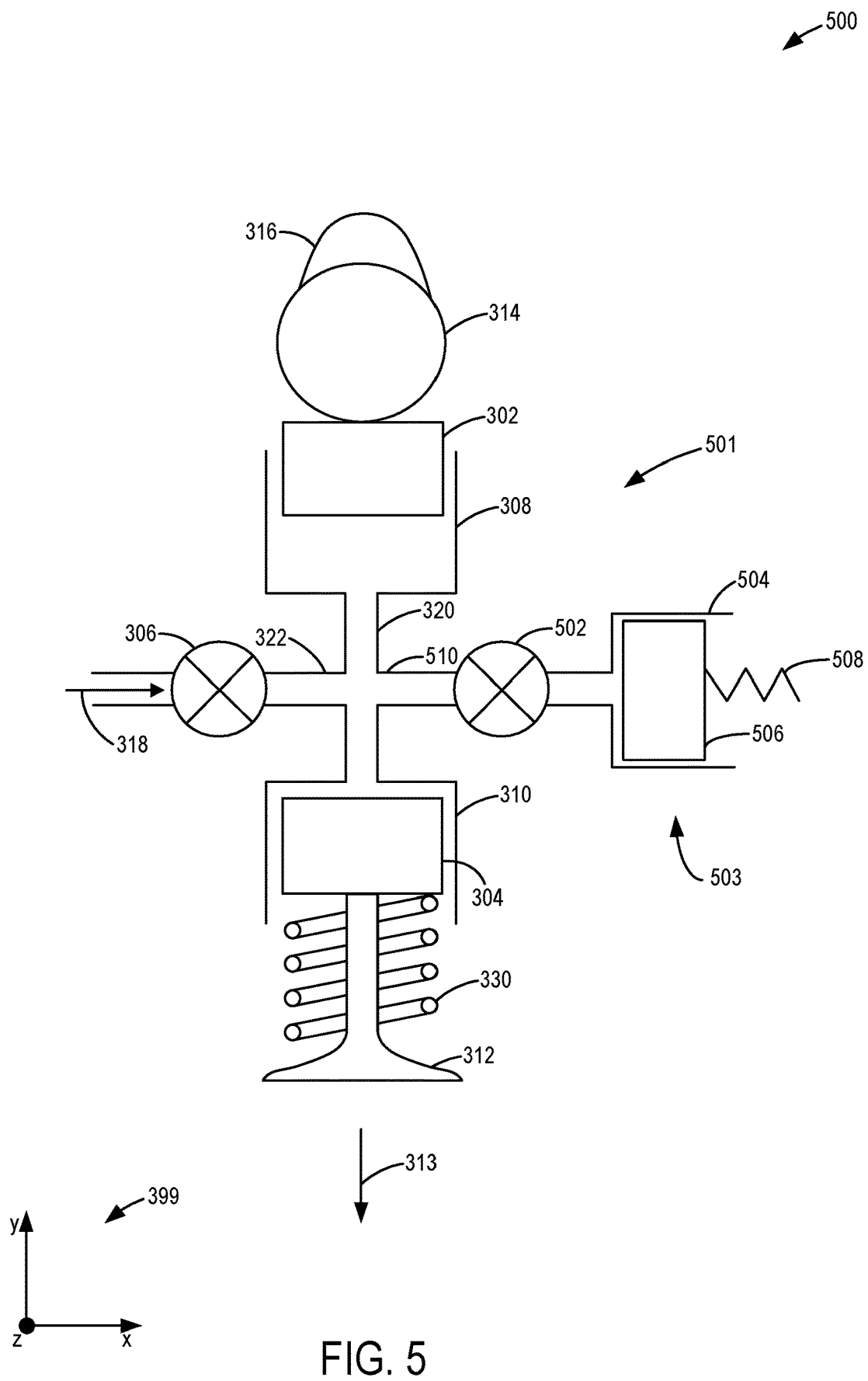
FIG. 5 shows a schematic view of a second example hydraulic valve mechanism with compression release for an engine.
Figure 6:
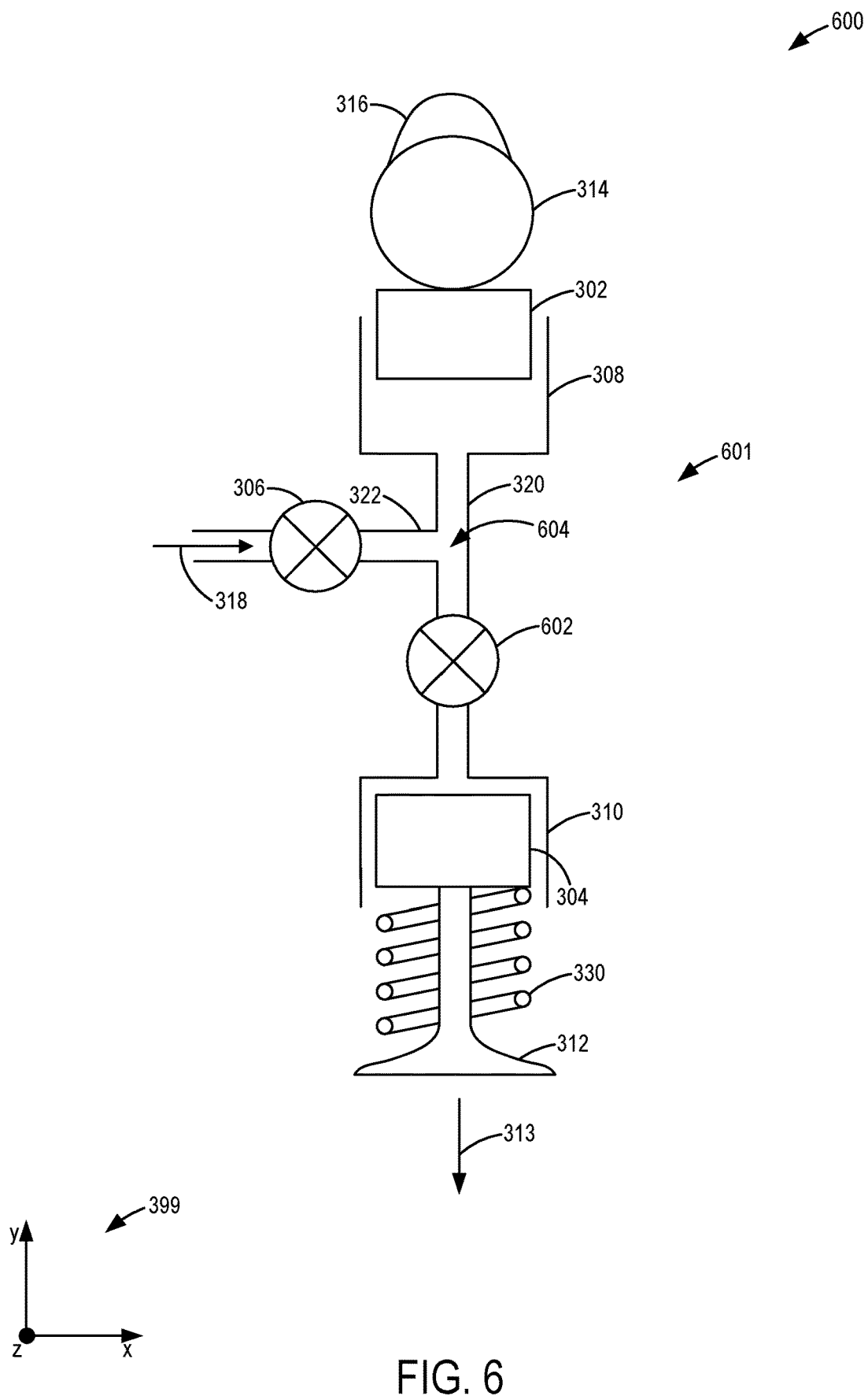
FIG. 6 shows a schematic view of a third example hydraulic valve mechanism with compression release for an engine.
Figure 7:
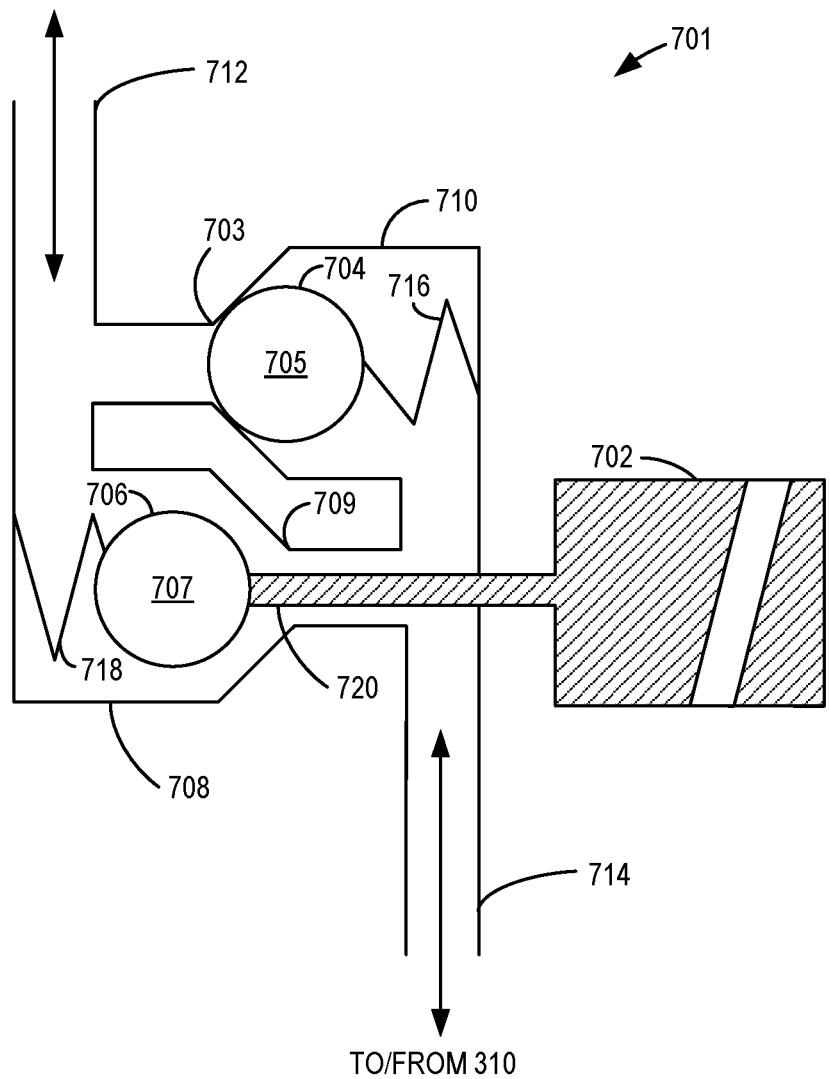
FIG. 7 shows a schematic view of a locking valve, such as may be used in the third example hydraulic valve mechanism with compression release shown in FIG. 6.
Figure 7:
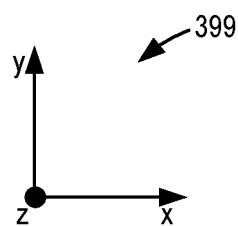

The following description relates to systems and methods for an engine having a continuous variable valve lift (CVVL) system and a stop/start system. The engine may have a plurality of cylinders, each having a cylinder configuration including hydraulic valve mechanisms for providing CVVL, as shown in FIG. 1. Further, as shown in FIG. 1, the engine may include a traction battery and an electric machine for providing torque to the wheels, and may include a stop/start system. The engine may have a multi-cylinder configuration and an exhaust system, as shown in FIG. 2. An example hydraulic valve mechanism, such as may be used for providing variable valve lift to a cylinder, is shown in FIG. 3. Further, in order to provide compression release to at least one cylinder, at least one hydraulic valve mechanism may be a hydraulic valve mechanism with compression release, so that cylinder pressure may be reduced in response to a stop/start event. For example, by providing compression release for at least one cylinder during a stop/start event, an amount of starting torque used to restart the engine may be reduced. As a result, less battery power is used to restart the engine (e.g., relative to when compression release is not used), and undesirable noise, vibration, and handling (NVH) issues during shutdown and restart are reduced. FIGS. 4-6 show example hydraulic valve mechanisms with compression release, and FIG. 7 shows an example locking valve, such as may be used in the hydraulic valve mechanism with compression release shown in FIG. 6. In response to a stop/start event, an amount of pressure in at least one cylinder may be reduced, according to the method shown in FIG. 8. Further, FIG. 9 depicts an example timeline for reducing an amount of starting torque during a stop/start event by using compression release.

Turning now to the figures, FIG. 1 shows a partial view of a single cylinder 130 of an internal combustion engine 10 that may be included in a vehicle 5. Internal combustion engine 10 may be a multi-cylinder engine, one example configuration of which will be described below with respect to FIG. 2. Cylinder (e.g., combustion chamber) 130 includes a coolant sleeve 114 and cylinder walls 132, with a piston 136 positioned therein and connected to a crankshaft 140. Combustion chamber 130 is shown communicating with an intake manifold 44 via an intake valve 4 and an intake port 22 and with an exhaust port 86 via exhaust valve 8.

In the depicted view, intake valve 4 and exhaust valve 8 are located at an upper region of combustion chamber 130. Intake valve 4 and exhaust valve 8 may be controlled by a controller 12 using respective cam actuation systems including one or more cams. The cam actuation systems may utilize one or more of cam profile switching (CPS), variable cam timing (VCT), variable valve timing (VVT), and/or variable valve lift (VVL) systems to vary valve operation. Specifically, the intake and/or exhaust valve may be controlled via a continuous variable valve lift (CVVL) system. For example, cylinder 130 may include intake valve 4 and exhaust valve 8 controlled via hydraulic valve mechanisms (e.g., hydraulic valve actuators). For example, a hydraulic mechanism may be used to control valve lift for the intake valve and the exhaust valve. In particular, the hydraulic valve mechanisms may be driven by one or more camshafts and may include hydraulic components for controlling an amount of valve lift. In the depicted example, intake valve 4 is controlled by an intake cam 151, and exhaust valve 8 is controlled by an exhaust cam 153. The intake cam 151 may be coupled to intake valve 4 via an intake hydraulic valve mechanism 101, and the exhaust cam 153 may be coupled to exhaust valve 8 via an exhaust hydraulic valve mechanism 103 according to set intake and exhaust valve lift amounts, respectively. For example, based on an amount of hydraulic pressure in intake hydraulic valve mechanism 101, and amount of intake valve lift may be adjusted. The position of intake cam 151 and exhaust cam 153 may be determined by camshaft position sensors 155 and 157, respectively. Further, in some examples, intake hydraulic valve mechanism 101 and exhaust hydraulic valve mechanism 103 may be configured so that each of the intake valve and the exhaust valve may be deactivated. For example, when a hydraulic pressure in intake hydraulic mechanism 101 is below a threshold hydraulic pressure, a rotation of intake cam 151 may not cause intake valve 4 to open. For example, the change in hydraulic pressure may be a result of hydraulic fluid displacement. For example, as hydraulic fluid is displaced, hydraulic pressure in the intake hydraulic mechanism 101 may increase. Example hydraulic valve mechanisms are shown in FIGS. 3-6.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 92 for initiating combustion. An ignition system 88 can provide an ignition spark to combustion chamber 130 via spark plug 92 in response to a spark advance signal SA from controller 12, under select operating modes. However, in some examples, spark plug 92 may be omitted, such as where engine 10 initiates combustion by auto-ignition or by injection of fuel, such as when engine 10 is a diesel engine.

As a non-limiting example, cylinder 130 is shown including one fuel injector 66. Fuel injector 66 is shown coupled directly to combustion chamber 130 for injecting fuel directly therein in proportion to a pulse-width of a signal FPW received from controller 12 via an electronic driver 168. In this manner, fuel injector 66 provides what is known as direct injection (hereafter also referred to as "DI") of fuel into cylinder 130. While FIG. 1 shows injector 66 as a side injector, it may also be located overhead of the piston, such as near the position of spark plug 92. Such a position may increase mixing and combustion when operating the engine with an alcohol-based fuel due to the lower volatility of some alcohol-based fuels. Alternatively, the injector may be located overhead and near the intake valve to improve mixing. In another example, injector 66 may be a port injector providing fuel into the intake port upstream of cylinder 130.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. In some examples, fuel system 180 may be coupled to a fuel vapor recovery system including a canister for storing refueling and diurnal fuel vapors. The fuel vapors may be purged from the canister to the engine cylinders during engine operation when purge conditions are met.

Engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 1 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described herein as well as other variants that are anticipated but not specifically listed. Controller 12 may receive various signals from sensors coupled to engine 10, in addition to those signals previously discussed, including a measurement of inducted mass air flow (MAF) from mass air flow sensor 48, an engine coolant temperature signal (ECT) from a temperature sensor 112 coupled to coolant sleeve 114, a profile ignition pickup signal (PIP) from a Hall effect sensor 120 (or other type) coupled to crankshaft 140, a throttle position (TP) from a throttle position sensor coupled to a throttle 62, and an absolute manifold pressure signal (MAP) from a MAP sensor 122 coupled to intake manifold 44. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as fuel injector 66, throttle 62, spark plug 92, the intake/exhaust valves and cams, etc. The controller may receive input data from the various sensors, process the input data, and trigger the actuators in response to the processed input data based on instruction or code programmed therein corresponding to one or more routines, an example of which is described with respect to FIG. 8.

In some examples, vehicle 5 may be a hybrid vehicle with multiple sources of torque available to one or more vehicle wheels 160. In other examples, vehicle 5 is a conventional vehicle with only an engine, or an electric vehicle with only electric machine(s). In the example shown, vehicle 5 includes engine 10 and an electric machine 161. Electric machine 161 may be a motor or a motor/generator and thus may also be referred to herein as an electric motor. Electric machine 161 receives electrical power from a battery 170 to provide torque to vehicle wheels 160. Electric machine 161 may also be operated as a generator to provide electrical power to charge battery 170, for example during a braking operation. In some examples, battery 170 may be a traction battery.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

For example, vehicle 5 may include a stop/start system in order to increase fuel efficiency during vehicle operation. As an example of the stop/start system, in response to an engine speed falling below a pre-determined engine speed, the controller 12 may determine to shut down the engine 10 in order to reduce fuel consumption and vehicle emissions (e.g., the controller may request a stop/start event). When additional vehicle speed is requested, the engine may be restarted via electric machine 161 and may briefly operate via electric power before cylinder combustion resumes. As an example, a vehicle may approach a traffic signal, and may reduce its speed before coming to a stop. Before resuming driving, the vehicle may wait for a period of time. In order to reduce time spent idling, the stop/start event is requested so that the engine is stopped for the period of time. In some examples, before re-starting the engine, power may be provided to the wheels 160 via electric machine 161 and battery 170 so that the vehicle may begin moving before the engine is re-started. After the vehicle begins moving (e.g., powered by the electric machine 161), engine 10 may be restarted, and nominal vehicle operation may resume (e.g., powered by internal combustion).

As mentioned above, FIG. 1 shows one cylinder of multi-cylinder engine 10. Referring now to FIG. 2, a schematic diagram of an example engine system 200 is shown, which may be included in the propulsion system of vehicle 5 of FIG. 1. For example, engine system 200 provides one example engine configuration of engine 10 introduced in FIG. 1. As such, components previously introduced in FIG. 1 are represented with the same reference numbers and are not reintroduced. In the example shown in FIG. 2, engine 10 includes cylinders 13, 14, 15, and 18, arranged in an inline-4 configuration, although other engine configurations are also possible (e.g., I-3, V-4, I-6, V-8, V-12, opposed 4, and other engine types). Thus, the number of cylinders and the arrangement of the cylinders may be changed without parting from the scope of this disclosure. The engine cylinders may be capped on the top by a cylinder head. Cylinders 14 and 15 are referred to herein as the inner (or inside) cylinders, and cylinders 13 and 18 are referred to herein as the outer (or outside) cylinders. The cylinders shown in FIG. 2 may each have a cylinder configuration, such as the cylinder configuration described above with respect to FIG. 1.

Each of cylinders 13, 14, 15, and 18 includes at least one intake valve 4 and at least one exhaust valve 8. The intake and exhaust valves may be referred to herein as cylinder intake valves and cylinder exhaust valves, respectively. As explained above with reference to FIG. 1, a timing (e.g., opening timing, closing timing, opening duration, etc.) of each intake valve 4 and each exhaust valve 8 may be controlled via various valve timing systems. Further, as explained above with reference to FIG. 1, a valve lift amount of each intake valve 4 and each exhaust valve 8 may be controlled via CVVL systems.

Each cylinder receives intake air (or a mixture of intake air and recirculated exhaust gas, as will be elaborated below) from intake manifold 44 via an air intake passage 28. Intake manifold 44 is coupled to the cylinders via intake ports (e.g., runners) 22. In this way, each cylinder intake port can selectively communicate with the cylinder it is coupled to via a corresponding intake valve 4. Each intake port may supply air, recirculated exhaust gas, and/or fuel to the cylinder it is coupled to for combustion.

As described above with respect to FIG. 1, a high pressure fuel system may be used to generate fuel pressures at the fuel injector 66 coupled to each cylinder. For example, controller 12 may inject fuel into each cylinder at a different timing such that fuel is delivered to each cylinder at an appropriate time in an engine cycle. As used herein, "engine cycle" refers to a period during which each engine cylinder fires once in a designated cylinder firing order. A distributorless ignition system may provide an ignition spark to cylinders 13, 14, 15, and 18 via the corresponding spark plug 92 in response to the signal SA from controller 12 to initiate combustion. A timing of the ignition spark may be individually adjusted for each cylinder or for a group of cylinders, as will be further described below with respect to FIG. 3.

Inside cylinders 14 and 15 are each coupled to an exhaust port (e.g., runner) 86 and outside cylinders 13 and 18 are each coupled to an exhaust port 87 for channeling combustion exhaust gases to an exhaust system 84. Each exhaust port 86 and 87 can selectively communicate with the cylinder it is coupled to via the corresponding exhaust valve 8. Specifically, as shown in FIG. 2, cylinders 14 and 15 channel exhaust gases to an exhaust manifold 85 via exhaust ports 86, and cylinders 13 and 18 channel exhaust gases to the exhaust manifold 85 via exhaust ports 87. Thus, engine system 200 includes a single exhaust manifold that is coupled to every cylinder of the engine.

Engine system 200 further includes a turbocharger 164, including a turbine 165 and an intake compressor 162 coupled on a common shaft (not shown). In the example shown in FIG. 2, turbine 165 is fluidically coupled to exhaust manifold 85 via a first exhaust passage 73. Turbine 165 may be a monoscroll turbine or a dual scroll turbine, for example. Rotation of turbine 165 drives rotation of compressor 162, disposed within intake passage 28. As such, the intake air becomes boosted (e.g., pressurized) at the compressor 162 and travels downstream to intake manifold 44. Exhaust gases exit turbine 165 into a second exhaust passage 74. In some examples, a wastegate may be coupled across turbine 165 (not shown). Specifically, a wastegate valve may be included in a bypass coupled between exhaust passage 73, upstream of an inlet of turbine 165, and exhaust passage 74, downstream of an outlet of turbine 165. The wastegate valve may control an amount of exhaust gas flowing through the bypass and to the outlet of turbine. For example, as an opening of the wastegate valve increases, an amount of exhaust gas flowing through the bypass and not through turbine 165 may increase, thereby decreasing an amount of power available for driving turbine 165 and compressor 162. As another example, as the opening of the wastegate valve decreases, the amount of exhaust gas flowing through the bypass decreases, thereby increasing the amount of power available for driving turbine 165 and compressor 162. In this way, a position of the wastegate valve may control an amount of boost provided by turbocharger 164. In other examples, turbine 165 may be a variable geometry turbine (VGT) including adjustable vanes to change an effective aspect ratio of turbine 165 as engine operating conditions change to provide a desired boost pressure. Thus, increasing the speed of turbocharger 164, such as by further closing the wastegate valve or adjusting turbine vanes, may increase the amount of boost provided, and decreasing the speed of turbocharger 164, such as by further opening the wastegate valve or adjusting the turbine vanes, may decrease the amount of boost provided.

Exhaust passage 73 further includes an exhaust gas temperature (EGT) sensor 98. In the example shown in FIG. 2, EGT sensor 98 is located upstream of turbine 165, such as near the inlet of turbine 165. As such, EGT sensor 98 may be configured to measure a temperature of exhaust gases entering turbine 165. In some examples, an output of EGT sensor 98 may be used by controller 12 to determine a turbine inlet temperature.

After exiting turbine 165, exhaust gases flow downstream in exhaust passage 74 to an emission control device 70. Emission control device 70 may include one or more emission control devices, such as one or more catalyst bricks and/or one or more particulate filters. For example, emission control device may 70 include a three-way catalyst configured to chemically reduce nitrogen oxides (NOx) and oxidize carbon monoxide (CO) and hydrocarbons (HC). In some examples, emission control device 70 may additionally or alternatively include a gasoline particulate filter (GPF). After passing through emission control device 70, exhaust gases may be directed out to a tailpipe. As an example, the three-way catalyst may be maximally effective at treating exhaust gas with a stoichiometric air-fuel ratio (AFR), as will be elaborated below.

Exhaust passage 74 further includes a plurality of exhaust sensors in electronic communication with controller 12, which is included in a control system 17. As shown in FIG. 2, second exhaust passage 74 includes a first oxygen sensor 90 positioned upstream of emission control device 70. First oxygen sensor 90 may be configured to measure an oxygen content of exhaust gas entering emission control device 70. Second exhaust passage 74 may include one or more additional oxygen sensors positioned along exhaust passage 74, such as a second oxygen sensor 91 positioned downstream of emission control device 70. As such, second oxygen sensor 91 may be configured to measure the oxygen content of the exhaust gas exiting emission control device 70. In one example, one or more of oxygen sensor 90 and oxygen sensor 91 may be a universal exhaust gas oxygen (UEGO) sensor. Alternatively, a two-state exhaust gas oxygen sensor may be substituted for at least one of oxygen sensors 90 and 91. Second exhaust passage 74 may include various other sensors, such as one or more temperature and/or pressure sensors. For example, as shown in FIG. 2, a sensor 96 is positioned within exhaust passage 74 upstream of emission control device 70. Sensor 96 may be a pressure sensor. As such, sensor 96 may be configured to measure the pressure of exhaust gas entering emission control device 70.

First exhaust passage 73 is coupled to an exhaust gas recirculation (EGR) passage 50 included in an EGR system 56. EGR passage 50 fluidically couples exhaust manifold 85 to intake passage 28, downstream of compressor 162. As such, exhaust gases are directed from first exhaust passage 73 to air intake passage 28, downstream of compressor 162, via EGR passage 50, which provides high-pressure EGR. However, in other examples, EGR passage 50 may be coupled to intake passage 28 upstream of compressor 162.

As shown in FIG. 2, EGR passage 50 may include an EGR cooler 52 configured to cool exhaust gases flowing from first exhaust passage 73 to intake passage 28 and may further include an EGR valve 54 disposed therein. Controller 12 is configured to actuate and adjust a position of EGR valve 54 in order to control a flow rate and/or amount of exhaust gases flowing through EGR passage 50. When EGR valve 54 is in a closed (e.g., fully closed) position, no exhaust gases may flow from first exhaust passage 73 to intake passage 28. When EGR valve 54 is in an open position (e.g., from partially open to fully open), exhaust gases may flow from first exhaust passage 73 to intake passage 28. Controller 12 may adjust the EGR valve 54 into a plurality of positions between fully open and fully closed. In other examples, controller 12 may adjust EGR valve 54 to be either fully open or fully closed. Further, in some examples, a pressure sensor 34 may be arranged in EGR passage 50 upstream of EGR valve 54.

As shown in FIG. 2, EGR passage 50 is coupled to intake passage 28 downstream of a charge air cooler (CAC) 40. CAC 40 is configured to cool intake air as it passes through CAC 40. In an alternative example, EGR passage 50 may be coupled to intake passage 28 upstream of CAC 40 (and downstream of compressor 162). In some such examples, EGR cooler 52 may not be included in EGR passage 50, as CAC cooler 40 may cool both the intake air and recirculated exhaust gases. EGR passage 50 may further include an oxygen sensor 36 disposed therein and configured to measure an oxygen content of exhaust gases flowing through EGR passage 50 from first exhaust passage 73. In some examples, EGR passage 50 may include additional sensors, such as temperature and/or humidity sensors, to determine a composition and/or quality of the exhaust gas being recirculated to intake passage 28 from exhaust manifold 85.

Intake passage 28 further includes throttle 62. As shown in FIG. 2, throttle 62 is positioned downstream of CAC 40 and downstream of where EGR passage 50 couples to intake passage 28 (e.g., downstream of a junction between EGR passage 50 and intake passage 28). A position of a throttle plate 64 of throttle 62 may be adjusted by controller 12 via a throttle actuator (not shown) communicatively coupled to controller 12. By modulating throttle 62 while operating compressor 162, a desired amount of fresh air and/or recirculated exhaust gas may be delivered to the engine cylinders at a boosted pressure via intake manifold 44.

To reduce compressor surge, at least a portion of the air charge compressed by compressor 162 may be recirculated to the compressor inlet. A compressor recirculation passage 41 may be provided for recirculating compressed air from a compressor outlet, upstream of CAC 40, to a compressor inlet. A compressor recirculation valve (CRV) 42 may be provided for adjusting an amount of flow recirculated to the compressor inlet. In one example, CRV 42 may be actuated open via a command from controller 12 in response to actual or expected compressor surge conditions.

Intake passage 28 may include one or more additional sensors (such as additional pressure, temperature, flow rate, and/or oxygen sensors). For example, as shown in FIG. 2, intake passage 28 includes MAF sensor 48 disposed upstream of compressor 162 in intake passage 28. An intake pressure and/or temperature sensor 31 is also positioned in intake passage 28 upstream of compressor 162. An intake oxygen sensor 35 may be located in intake passage 28 downstream of compressor 162 and upstream of CAC 40. An additional intake pressure sensor 37 may be positioned in intake passage 28 downstream of CAC 40 and upstream of throttle 62 (e.g., a throttle inlet pressure sensor). In some examples, as shown in FIG. 2, an additional intake oxygen sensor 39 may be positioned in intake passage 28 between CAC 40 and throttle 62, downstream of the junction between EGR passage 50 and intake passage 28. Further, MAP sensor 122 and an intake manifold temperature sensor 123 are shown positioned within intake manifold 44, upstream of the engine cylinders.

Engine 10 may be controlled at least partially by control system 17, including controller 12, and by input from the vehicle operator (as described above with respect to FIG. 1). Control system 17 is shown receiving information from a plurality of sensors 16 (various examples of which are described herein) and sending control signals to a plurality of actuators 83. As one example, sensors 16 may include the pressure, temperature, and oxygen sensors located within intake passage 28, intake manifold 44, first exhaust passage 73, second exhaust passage 74, and EGR passage 50, as described above. Other sensors may include a throttle inlet temperature sensor for estimating a throttle air temperature (TCT) coupled upstream of throttle 62 in the intake passage. Further, it should be noted that engine 10 may include all or a portion of the sensors shown in FIG. 2. As another example, actuators 83 may include fuel injectors 66, throttle 62, CRV 42, EGR valve 54, and spark plugs 92. Actuators 83 may further include various camshaft timing actuators coupled to the cylinder intake and exhaust valves (as described above with reference to FIG. 1). Controller 12 may receive input data from the various sensors, process the input data, and trigger the actuators in response to the processed input data based on instruction or code programmed in a memory of controller 12 corresponding to one or more routines. For example, controller 12 may perform compression release prior to an engine restart according to the example method (e.g., routine) of FIG. 8.

As elaborated above with respect to FIG. 1, an internal combustion engine may include hydraulic valve mechanisms for opening and closing valves, such as intake valves and exhaust valves. For example, as shown in FIG. 1, the intake valve 4 is controlled by the intake hydraulic valve mechanism 101, and the exhaust valve 8 is controlled by the exhaust hydraulic valve mechanism 103. Each hydraulic valve mechanism may control how camshaft rotation is translated into linear valve lift. For example, a hydraulic valve mechanism may include a valve for adjusting a pressure of hydraulic fluid in the hydraulic valve mechanism, with a position of the valve controlled by a controller (e.g., such as controller 12 of FIG. 1).

FIG. 3 shows a view 300 of an example hydraulic valve mechanism 301, such as may be used in a CVVL system in a vehicle, such as vehicle 5 shown in FIGS. 1 and 2, in order to provide variable valve lift. As an example, the hydraulic valve mechanism 301 may be used as intake hydraulic valve mechanism 101 of FIG. 1. As another example, the hydraulic valve mechanism 301 may be used as exhaust hydraulic valve mechanism 103 of FIG. 1. Further, FIG. 3 is a schematic, x-y planar view of hydraulic valve mechanism 301, as shown by references axes 399. As shown in FIG. 3, hydraulic valve mechanism 301 hydraulically couples a cam 314 of a camshaft to a valve 312 of a cylinder. Valve 312 may be one of an intake valve and an exhaust valve of a cylinder, and may also compress a valve spring 330. In particular, the hydraulic valve mechanism 301 may be configured so that adjusting an amount of hydraulic pressure between the cam 314 and the valve 312 changes an amount of valve lift for valve 312.

As shown in FIG. 3, the hydraulic valve adjuster 301 includes a cam piston 302 in a cam cylinder 308 and a valve piston 304 in a valve cylinder 310. Each of the cam cylinder 308 and the valve cylinder 310 may be at least partially filled with hydraulic fluid, and the cam cylinder 308 may be fluidically coupled to the valve cylinder 310 via an intercylinder line 320. For example, because the cam cylinder 308 is at least partially filled with hydraulic fluid, adjusting an amount of hydraulic pressure in in the cam cylinder 308 may adjust a position of the cam piston 302. For example, the cam 314 may remain in contact with the cam piston 302. For example, the amount of pressure in the cam cylinder 308 varies based on the position of the cam piston 302, which is controlled by the cam 314. Therefore, the pressure is lower at base circle and higher at the lobe, with the pressure increasing as the lift of the lobe portion in contact with the cam piston increases, as this further displaces the cam piston in the negative y-direction. Further, because the valve cylinder 310 is at least partially filled with hydraulic fluid, adjusting the amount of hydraulic pressure in the valve cylinder 310 may adjust a position of the valve piston 304 and valve 312. For example, increasing the amount of hydraulic pressure may cause valve 312 to move in a valve lift direction 313, resulting in a greater degree of opening (e.g., amount of lift) of valve 312. Valve lift direction 313 is parallel to the y-axis of reference axes 399. In particular, increasing an amount of valve lift for valve 312 includes moving the valve in the negative y-direction, with respect to reference axes 399.

An amount of hydraulic pressure in the hydraulic valve mechanism 301 may be adjusted by adjusting a hydraulic control valve 306, which may be positioned in a hydraulic supply line 322. For example, hydraulic fluid in the hydraulic valve mechanism 301 may be provided and refreshed via the hydraulic supply line 322. As one example, hydraulic control valve 306 may be adjustable between a plurality of positions ranging from fully closed (in which flow of the hydraulic fluid through hydraulic control valve 306 is blocked) and fully open (in which a maximum flow area is provided in hydraulic control valve 306). In some examples, hydraulic control valve 306 may be a continuously variable valve, while in other examples, hydraulic control valve 306 may include a finite number of steps or positions. In still other examples, hydraulic control valve 306 may be an on/off valve adjustable between the fully closed position and the fully open position and no positions in between. Further, hydraulic control valve 306 may be an electronically actuated valve that is adjusted in response to (e.g., responsive to) a control signal from an electronic controller, such as controller 12 of FIGS. 1 and 2, in order to adjust the amount of valve lift of valve 312. Adjusting the amount of valve lift for valve 312 may change one or more cylinder operating parameters by adjusting air flow to and from the cylinder. Further, by adjusting the hydraulic pressure of the hydraulic valve mechanism 301, the valve may be opened and/or closed at any cam position. For example, if valve 312 is closed, it may be reopened by increase cam lift.

By including hydraulic valve mechanisms, such as hydraulic valve mechanism 301 shown in FIG. 3, in an engine system, an amount of valve lift may be continuously varied via CVVL. CVVL may provide performance benefits to the engine, such as decreased emissions and increased fuel efficiency. However, in some engine systems, such as those including a stop/start system, the inventors herein have recognized that CVVL may be advantageously adapted for providing compression release in order to reduce an amount of torque used to restart the engine during a stop/start event. Specifically, during a stop/start event, high cylinder pressure may increase an amount of torque used to restart an engine, which may influence vehicle efficiency and customer comfort. For example, in order to restart the engine without a perceptible change in vehicle acceleration, sufficient torque must be reserved by a traction battery to enable restarting. For example, before restarting the engine, electric-only operation may be used to begin moving the vehicle, which may dictate a certain amount of battery charge be available. As such, if the traction battery charge is too low to generate enough torque, the stop/start system may not be used, and the engine may remain on instead of being shut down. Therefore, the relatively high amount of starting torque used for a stop/start event may decrease an incidence of electric-only operation and degrade the overall vehicle fuel economy. Further, electric machine/generator sizing may be determined based on the amount torque used to restart the engine. For example, large engines may be more difficult to start using belt-driven electric machines due to a torque capacity of the belt drive. Further still, stop/start torque produces reaction forces on the vehicle body, which may increase an incidence of undesirable noise, vibration, and handling (NVH) issues. For these reasons, methods for reducing an amount of torque used to restart an engine are desired.

Further, in some examples, reducing an amount of torque required to turn an engine may be desired during other phases of engine operation, rather than during a stop/start event, such as when an electric motor drives the vehicle. As such, a compression release hydraulic valve mechanism (e.g., such as the compression release hydraulic valve mechanisms shown in FIG. 4-7) may provide compression release to reduce an amount of torque required to turn the engine. As an example, during a fuel-cut event, compression release may be provided by a compression release hydraulic valve mechanism in order to reduce an amount of torque used to spin the engine and increase an amount of time the engine may remain off. As another example, a compression release hydraulic valve mechanism may be used to reduce an amount of parasitic drag while spinning the engine. As an example, in some hybrid vehicles, the engine may continue to spin when an electric motor drives the vehicle, and a compression release hydraulic valve mechanism may reduce losses from spinning the engine. As yet another example, the compression release hydraulic mechanism may be used to provide engine braking in other engine operating conditions.

FIGS. 4-7 show three example hydraulic valve mechanisms for CVVL with compression release. In particular, the example hydraulic valve mechanisms shown in FIGS. 4-7 enable an amount of cylinder pressure to be reduced by adjusting an amount of hydraulic pressure in the hydraulic valve mechanism. Components of FIGS. 4-7 that function the same as components of FIG. 3 are numbered the same and will not be reintroduced.

Turning first to FIG. 4, a schematic view 400 of a first compression release hydraulic valve mechanism 401 is shown. As an example, the first compression release hydraulic valve mechanism 401 may be used as intake hydraulic valve mechanism 101 of FIG. 1. For example, similar to the hydraulic valve mechanism 301 of FIG. 3, the first compression release hydraulic valve mechanism 401 is shown in an x-y planar view, indicated by reference axes 399, and includes cam piston 302 positioned in cam cylinder 302, valve piston 304 positioned in valve cylinder 310, inter-cylinder line 320, hydraulic supply line 322, and hydraulic control valve 306. Hydraulic fluid may flow into compression release hydraulic valve mechanism 401, and a hydraulic pressure in the compression release hydraulic valve mechanism 401 may be controlled by a position of the hydraulic control valve 306.

However, rather than a single-lobe cam, such as cam 314 of hydraulic valve mechanism 301, the first compression release hydraulic valve mechanism 401 includes a dual-lobe cam 402. The dual-lobe cam 402 includes a high-lift lobe 404 and a low-lift lobe 406. High-lift lobe 404 has a greater lift height from a base circle 403 of dual-lobe cam 402, indicated as L1, than low-lift lobe 406, which has a lift height L2. As a result, low-lift lobe 406 opens valve 312 to a smaller degree than high-lift lobe 404, resulting in valve 312 extending a smaller distance into a cylinder when low-lift lobe 406 is used.

The dual-lobe cam 402 may provide valve lift during normal engine operation, and may further provide compression release during a stop/start event or other operating conditions when a decrease torque for turning the engine is requested. For example, during nominal engine operation (e.g., while the engine is not being shut down or restarted for a stop/start event and cylinder combustion is requested), the high-lift lobe 404 may open valve 312 (e.g., cause the valve 312 to move in lift direction 313), which may be an intake valve, to provide intake air to a cylinder, and the low-lift lobe 406 may be skipped by keeping the hydraulic control valve 306 open when low-lift lobe 406 is in contact with cam piston 302. For example, by keeping hydraulic control valve 306 open, when low-lift lobe 406 acts on cam piston 302, hydraulic fluid may flow out of hydraulic control valve 306. As a result, hydraulic pressure will not build within cam cylinder 308 and be transferred valve cylinder 310 (e.g., via inter-cylinder line 320). Thus, when hydraulic control valve 306 is open, valve 312 may not be displaced in lift direction 313 and may remain closed. In other examples, valve 312 may be an exhaust valve of the cylinder.

In contrast, during a stop/start event, the hydraulic control valve 306 may adjust hydraulic pressure in the hydraulic valve mechanism with compression release 401 so that the low-lift lobe 406 at least partially lifts valve 312 in lift direction 313, providing compression release by enabling air within the cylinder to flow through the open valve 312 instead of remaining trapped and compressed within the cylinder. For example, high-lift lobe 404 may act on cam piston 302 during an intake stroke, and low-lift lobe 406 may be oriented relative to high-lift lobe 404 at a defined angle in order to act on cam piston 302 during at least part of a compression stroke and/or an expansion stroke. Further still, the smaller lift height L2 of low-lift lobe 406 may be calibrated to avoid piston interference, for at least part of a compression stroke and expansion strokes. A duration of the low-lift lobe 406 may be selected based on a number of factors. For example, a longer duration may be selected to achieve full cylinder pressure release during a stop/start event, while a shorter duration may be selected to provide partial cylinder pressure release. Further, in some examples, having a gap between the high-lift lobe 404 and the low-lift lobe 406 at which dual-lobe cam 402 returns to base circle 403 may increase controllability. For example, by including a gap between the high-lift lobe 404 and the low-lift lobe 406, an amount of pressure in the compression release hydraulic valve mechanism 401 may be adjusted by adjusting valve 306 during the gap, and not before dual-lobe cam 402 returns to base circle 403. For example, during a single engine cycle, the high-lift lobe 404 may be used, and during the gap, the amount of pressure in the compression release hydraulic valve mechanism 401 may be adjusted so that the low-lift lobe 406 is not used while an entirety of high-lift lobe 404 is used.

Next, FIG. 5 shows a second example compression release hydraulic valve mechanism 501. As shown by reference axes 399, view 500 is an x-y planar view of hydraulic valve mechanism with compression release 501. In particular, compression release hydraulic valve mechanism 501 includes an accumulator 503 for providing compression release. For example, similar to the hydraulic valve mechanism 301 of FIG. 3, compression release hydraulic valve mechanism 501 includes cam 314 with one cam lobe 316, valve 312, cam piston 302 in cam cylinder 308, valve piston 304 in valve cylinder 310, and hydraulic control valve 306 controlling hydraulic fluid in hydraulic supply line 322 and inter-cylinder line 320. Thus, during nominal engine operation, compression release hydraulic valve mechanism 501 may provide continuous variable valve lift to valve 312. For example, compression release hydraulic valve mechanism 501 may be used as intake hydraulic valve mechanism 101 of FIG. 1, and valve 312 may be intake valve 4 of FIG. 1.

The accumulator 503 may be configured to hold an amount of hydraulic fluid at a high pressure during nominal operation. For example, accumulator 503 includes an accumulator valve 502, an accumulator piston 506, an accumulator spring 508, and an accumulator cylinder 504. The accumulator spring 508 may apply pressure to accumulator piston 506 so that accumulator piston 506 compresses hydraulic fluid in the accumulator cylinder 504. For example, when the accumulator valve 502 is closed, the accumulator cylinder 504 holds the hydraulic fluid at a high pressure, which may be higher relative to a pressure of hydraulic fluid in the inter-cylinder line 320. Thus, during nominal engine operation, the accumulator valve 502 may be maintained closed, and the compression release hydraulic valve mechanism 501 may operate similar to the hydraulic valve mechanism 301 of FIG. 3.

In order to provide compression release during a stop/start event, the accumulator valve 502 may be opened to flow high pressure hydraulic fluid through the accumulator line 510 to the inter-cylinder line 320, causing the valve piston 304 to lift valve 312 in lift direction 313. Stated differently, opening the accumulator valve 502 before or during a stop/start event causes the valve 312 to at least partially open in lift direction 313. For example, air may flow through the open valve 312 instead of being trapped within the cylinder (e.g., during a compression stroke and an expansion stroke), thereby reducing cylinder pressure. As a non-limiting example, a volume of the accumulator cylinder 504 and a stiffness of the accumulator spring 508 may be configured so that valve 312 opens a relatively small amount (e.g., compared to when valve 312 is opened for inducting intake air) when the accumulator valve 502 is opened, such as approximately 1-2 mm, in order to avoid piston-to-valve interference.

Further, FIG. 6 shows a third example compression release hydraulic valve mechanism 601. Compression release hydraulic valve mechanism 601 includes a locking valve 602, which may be positioned in the inter-cylinder line 320 between the cam cylinder 308 and the valve cylinder 310. Further, the locking valve 602 is positioned on a valve side of an intersection 604 between the hydraulic supply line 322 and the inter-cylinder line 320. As such, closing the locking valve 602 may prevent hydraulic fluid from flowing into or out of the valve cylinder 310. In order to provide compression release, the locking valve may be closed while the valve 312 is open, so that the valve 312 is locked in an open position, allowing cylinder pressure to decrease. When sufficient compression release has been achieved, the locking valve 602 may be opened so that the valve 312 may close. In some examples, the locking valve 602 may be closed when the valve 312 is opened with relatively low lift (e.g., 1-2 mm) in order to avoid piston interference. Further, in some examples, in order to prevent an over-pressure event in the inter-cylinder line 320 when the locking valve 602 is closed, the hydraulic control valve 306 may be opened to reduce hydraulic pressure in the inter-cylinder line 320.

Further, in some examples, the locking valve 602 may be a pressure limiting check valve. FIG. 7 shows a schematic view of a pressure limiting check valve 701, which may be used as locking valve 602 of FIG. 6. Pressure limiting check valve 701 is fluidically coupled to compression release hydraulic valve mechanism release 601 (not shown in FIG. 7) via a first inlet 712 and a second inlet 714. For example, first inlet 712 receives hydraulic fluid from and flows hydraulic fluid to cam cylinder 308, and second inlet 714 receives hydraulic fluid from and flows hydraulic fluid to valve cylinder 310. Thus, a pressure at which fluid enters second inlet 714 corresponds to a hydraulic pressure applied to valve piston 304 shown in FIG. 6. Locking valve 602 may be used to lock valve 312 in an open position, as will be elaborated below, in order to enable air (e.g., gas) to flow out of a cylinder to provide compression release.

Pressure limiting check valve 701 includes a first check valve 706 positioned in a first chamber 708 and a second check valve 704 positioned in a chamber 710. First check valve 706 includes a ball 707 that is biased toward a seat 709 via a spring 718. When ball 707 is in direct contact with seat 709, first check valve 706 is closed, and hydraulic fluid does not flow through seat 709 and first chamber 708. Similarly, second check valve 704 includes a ball 705 that is biased toward a seat 703 by a spring 716. When ball 705 is in direct contact with seat 703, second check valve 704 is closed, and hydraulic fluid does not flow through seat 703 and second chamber 710. Thus, in the example shown in FIG. 7, first check valve 706 and second check valve are both spring-loaded ball check valves.

However, first check valve 706 is also controlled by a solenoid 702. As shown, solenoid 702 includes a rod 720, which may be a solenoid shaft, for example. Rod 720 is in direct contact with ball 707 of first check valve 706. For example, an end of rod 720 may be fixedly coupled to ball 707 of first check valve 706. Actuating solenoid 702 may linearly translate the rod 720 in the x-direction with respect to reference axes 399, which may also cause the first bearing 706 to move in the x-direction. Thus, solenoid 702 may be actuated to keep locking valve 602 open, with rod 720 providing a counter-force to the spring force from spring 718 in the negative x-direction to hold the first check valve 706 in place. As a result, hydraulic fluid may flow through the first chamber 708. As one example, solenoid 702 may hold first check valve 706 open when energized and may not hold first check valve 706 open when de-energized. Alternative, solenoid 702 may not hold first check valve 706 open when energized and may hold first check valve 706 open when de-energized.

To close the first check valve 706, rod 720 may not apply counter-force to the spring 718, enabling spring 718 to push ball 707 into seat 709 to block flow through the first chamber 708. However, even when solenoid 702 is not actuated to open first check valve 706, first check valve 706 may open when the hydraulic pressure at second inlet 714 is greater than the pressure in first chamber 708 and is further great enough to overcome the spring force of spring 718. Thus, pressure limiting check valve 701 may enable back flow of the hydraulic fluid from valve cylinder 310 during high pressure conditions (e.g., above a pressure rating of the first check valve 706).

As an example, the first check valve 706 may be closed during an engine shut down and held open during a restart by solenoid 702. Under some operating conditions, pressure within second chamber 710 (e.g., from second inlet 714) and the spring force of spring 716 may hold second check valve 704 in the closed position, with ball 705 sealed against seat 703, such that hydraulic fluid is blocked from flowing through second chamber 710. However, in other operating conditions, such as when flow is blocked through the first chamber 708 (e.g., first check valve 706 is closed) and pressure through the first inlet 712 is high, hydraulic pressure may counteract spring force from spring 716, causing ball 705 of second check valve 704 to move in the positive x-direction with respect to reference axes 399, away from seat 703, so that hydraulic fluid may flow through second chamber 710 to second inlet 714. In this way, over-pressurizing cam cylinder 308 may be avoided.

Each of the three example compression release hydraulic valve mechanisms shown in FIGS. 4-6 may be used in an engine system with CVVL to adjust an amount of cylinder pressure in each cylinder during a stop/start event. For example, after stopping the engine, a hydraulic valve mechanism with compression release may be used to reduce cylinder pressure in at least one cylinder of the engine, which may in turn reduce an amount of torque used to restart the engine. In some examples, a combination of the three example hydraulic valve mechanisms with compression release may be used. As an example, a first cylinder of an engine may include the first compression release hydraulic valve mechanism 401, and a second cylinder of the engine may include the second compression release hydraulic valve mechanism 501. Further, in some examples, only a subset of cylinders may include compression release hydraulic valve mechanisms, while the remaining cylinders may include hydraulic valve mechanism without compression release (e.g., hydraulic valve mechanism 301 of FIG. 3). As an example, a first cylinder of an engine may include a traditional CVVL mechanism without a compression release mechanism, while a second cylinder of the engine may include a hydraulic valve mechanism with compression release. In this way, an engine with CVVL may include compression release for controlling cylinder pressurization.

Figure 8:
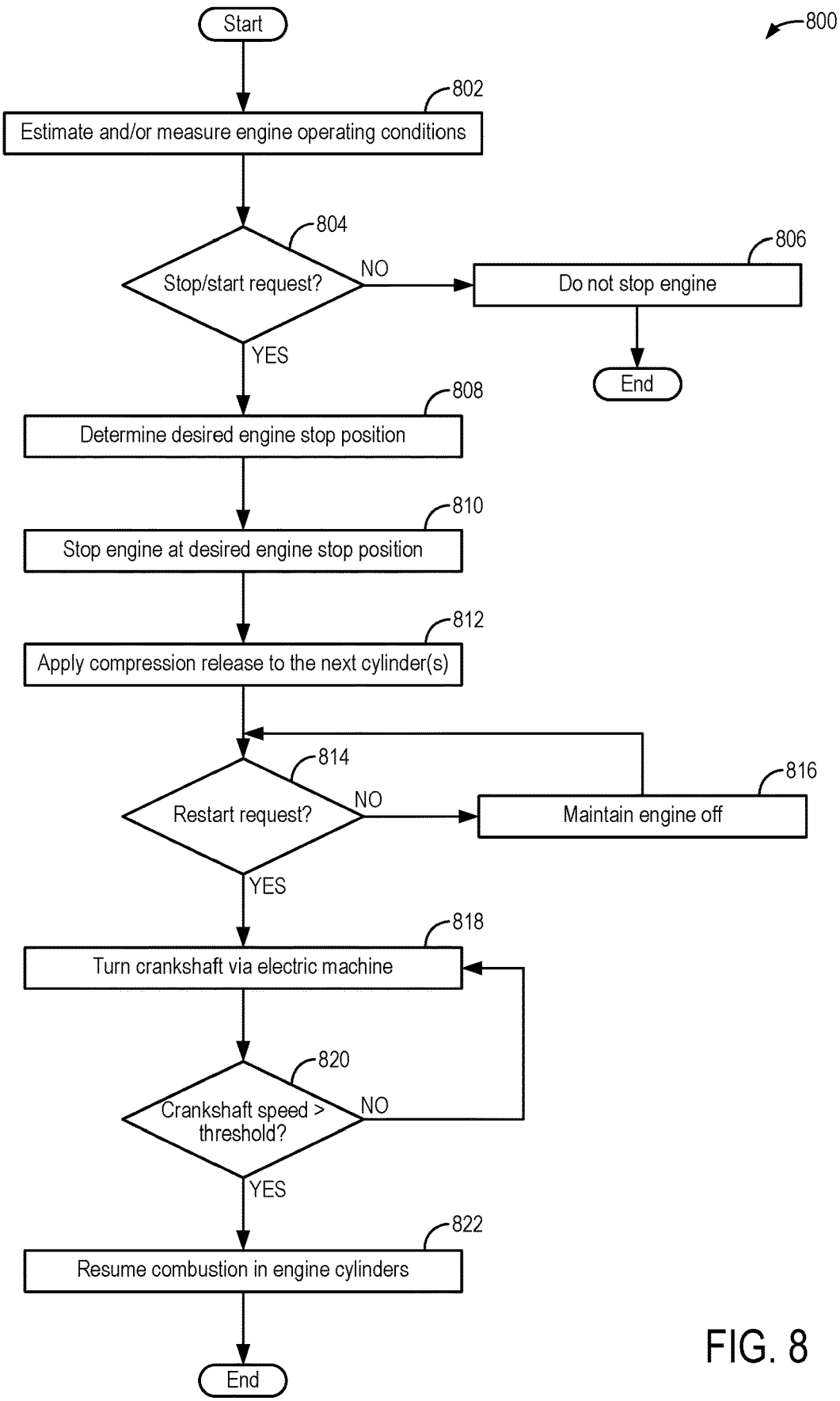
FIG. 8 shows an example method for operating an engine with at least one hydraulic valve mechanism with compression release during a stop/start event.
Figure 9:
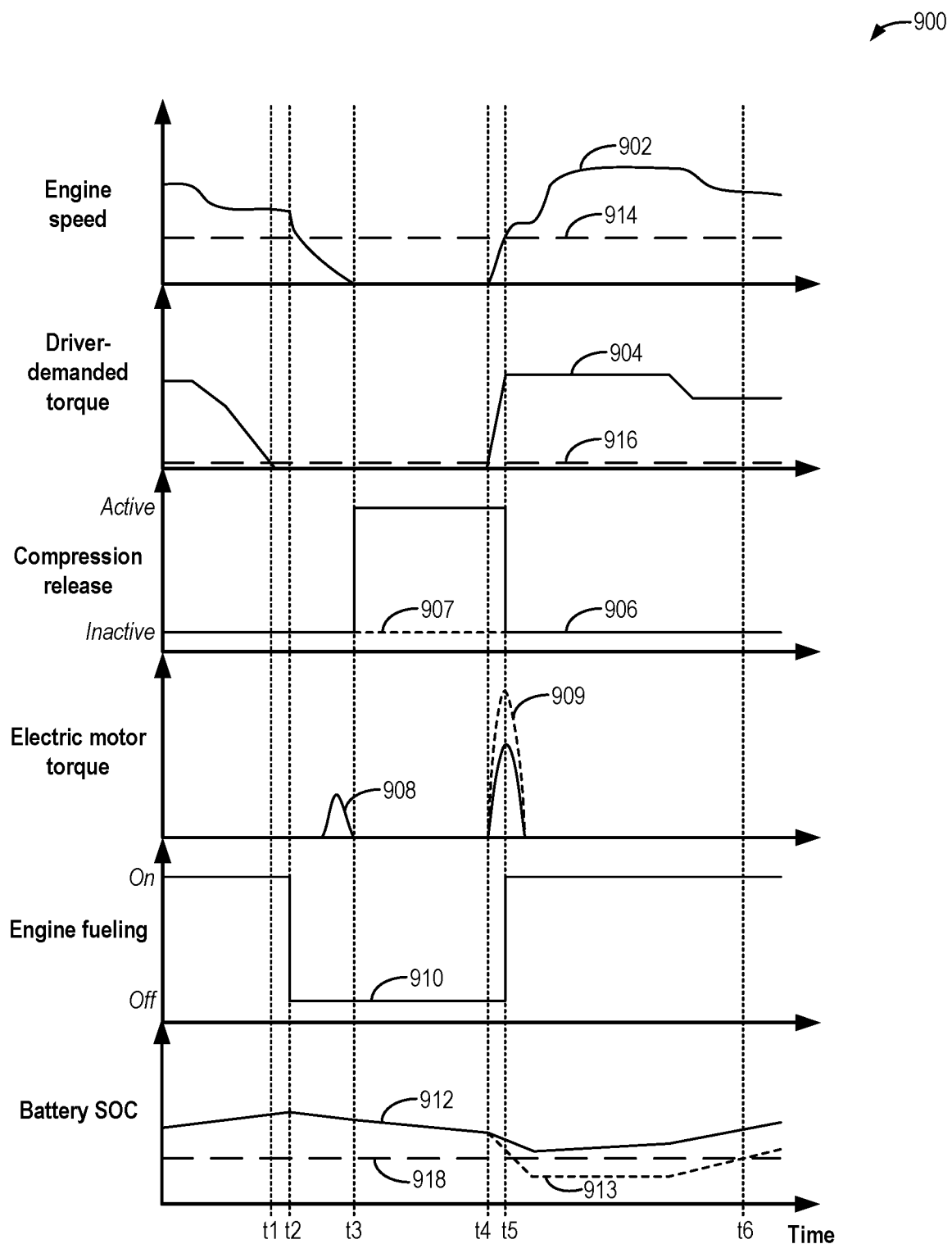
FIG. 9 shows a prophetic example timeline of using compression release to reduce electric motor torque during an engine restart.

Next, FIG. 8 shows a flow chart of an example method 800 for applying compression release during a stop/start event in order to reduce an amount of torque used to restart an engine with CVVL and included in a stop/start system. Method 800 will be described with respect to the cylinder configuration shown in FIG. 1 and the engine configuration shown in FIG. 2, although method 800 may be applied in other systems that include hydraulic valve mechanisms with compression release. Further, method 800 may be carried out in systems including any or all of the compression release hydraulic valve mechanisms shown in FIGS. 4-6. Instructions for carrying out method 800 may be executed by a controller, such as controller 12 of FIGS. 1 and 2, based on instructions stored on a memory of the controller and in conjunction with signals received from sensors of the engine system, such as the sensors described with reference to FIGS. 1 and 2. The controller may employ engine actuators of the engine system to adjust engine operation according to the methods described below.

At 802, method 800 includes estimating and/or measuring engine operating conditions. The operating conditions may include, for example, vehicle speed, engine speed, engine load, an accelerator pedal position, a brake pedal position, a throttle position, and a state of charge (SOC) of a system battery (e.g., battery 170 of FIG. 1). The SOC may refer to an amount of charge stored in the system battery relative to a total charge capacity and may be given as a percentage. The operating conditions may be measured by one or more sensors communicatively coupled to the controller or may be inferred based on available data. For example, the controller may estimate the engine load by inputting the throttle position and a mass air flow (MAF) sensor reading into one or more look-up tables, maps, or functions, which may output engine load. As another example, the accelerator pedal position may be measured by an accelerator pedal position sensor, such as accelerator pedal position sensor 118 of FIG. 1, and the brake pedal position may be measured by a brake pedal position sensor, such as brake pedal position sensor 119 of FIG. 1. Together, the accelerator pedal position and the brake pedal position may indicate a demanded amount of engine torque. As yet another example, the SOC may be determined by a battery monitor coupled to the system battery.

At 804, method 800 includes determining whether a stop/start event is requested. As one example, the controller may determine that a stop/start event is requested in response to a sustained braking event. As another example, the controller may determine that a stop/start event is requested in response to a decrease in engine speed. In some examples, the controller may rely on a combination of operating conditions (e.g., two or more of engine speed, vehicle speed, driver-demanded torque, braking, etc.) in order to determine that a stop/start event is requested.

Specifically, in determining whether a stop/start event is requested, it may be determined if engine shutdown conditions are met for an auto-stop. For example, an engine shutdown may be requested for an idle-stop, wherein the engine is shut down while the vehicle remains on and at rest (e.g., for a static start-stop) or coasting (e.g., for a rolling start-stop). As another example, the engine shutdown may be requested to transition the vehicle from operating in an engine mode (where torque to propel the vehicle is at least partially provided by the engine) to operating in an electric mode (where torque to propel the vehicle is provided by an electric motor, such as electric machine 161 shown in FIG. 1, and not by the engine). The engine shutdown conditions may include, for example, the battery SOC being above a threshold SOC and the driver-demanded torque being less than a threshold torque. The threshold SOC may be defined as a battery charge level below which the battery may not be able to support or execute additional vehicle functions while the engine is off and/or may be unable to provide enough torque (or power) to restart the engine. As one non-limiting example, the threshold SOC is 30%. As another example, the controller may input an electric machine sizing and the battery SOC into one or more look-up tables, maps, or functions, which may output an amount torque available for electrically restarting the engine, which may be compared with an estimated amount of torque for restarting the engine once stopped.

The threshold (driver-demanded) torque may vary based on whether the engine shutdown is requested for an idle-stop or for transitioning to the electric mode of operation. For example, the threshold torque may be a positive, non-zero amount of driver-demanded torque that the electric motor is able to meet and/or sustain when the engine shutdown is requested for transitioning to the electric mode of operation. The electric motor may not be able to meet or sustain torque levels above the threshold torque, for example. In contrast, the threshold torque may be lower when the engine shutdown is requested for a static start-stop or a rolling start-stop, such as a torque amount corresponding to a neutral (e.g., undepressed) accelerator pedal position.

As another example, the engine shutdown conditions may additionally or alternatively include the vehicle speed being less than a threshold speed. Similar to the threshold torque, the threshold speed may vary based on whether the engine shutdown is requested for an idle-stop or for transitioning to the electric mode of operation. For example, the threshold vehicle speed may be lower (e.g., in a range from 0-5 mph) when the engine shutdown is requested for an idle-stop and higher (e.g., in a range from 10-30 mph) when the engine shutdown is requested for transitioning to the electric mode of operation. As still another example, the engine shutdown conditions may include the engine idling for longer than a first threshold duration, such as when the engine shutdown is requested for an idle-stop. The first threshold duration refers to a non-zero time duration, such as a duration in a range from 1-10 seconds, of the engine operating at idle speed. The engine shut down conditions may further include the engine currently being on (and not already off).

All of the corresponding engine shutdown conditions for the particular request (e.g., for an idle-stop or for transitioning to electric mode) may be confirmed for the stop/start event to be requested and the engine shutdown to be initiated. Both shutting down the engine for an idle-stop and shutting down the engine for transitioning to the electric mode of operation may be referred to herein as an engine auto-stop, as the engine is shut down automatically by the controller and without a direct request from the driver.

If the controller determines that a stop/start is not requested at 804 (e.g., one of the engine shutdown conditions is not met), method 800 continues to 806 and includes not stopping the engine. For example, fuel and spark will continue to be provided to the engine cylinders to produce combustion torque, and compression release may not be applied to a cylinder based on a desired engine stop position. As such, the engine may continue to turn a crankshaft due to expanding combustion gases. Method 800 may then end. For example, method 800 may be repeated at a pre-determined frequency or responsive to a detected change in operating conditions.

If the controller determines instead that a stop/start is requested at 804, method 800 continues to 808 and includes determining a desired engine stop position. In some examples, only a subset of cylinders may be equipped with hydraulic valve mechanisms with compression release. Therefore, in order to obtain the benefits of compression release, the desired engine stop position may be determined so that the next compression cylinder in the engine cycle includes a hydraulic valve mechanism with compression release in order to reduce the amount of torque for restarting the engine. For example, the controller may input the current engine position into one or more look-up tables, maps, or functions, which may output the desired engine stop position. As another example, all cylinders may be equipped with hydraulic valve mechanisms with compression release, and any engine stop position may allow compression release upon restart. In such an example, the desired engine stop position may be selected based on other engine operating conditions, such as engine speed and a number of engine cylinders.

At 810, method 800 includes stopping the engine at the desired engine stop position. For example, combustion in the cylinders may be stopped, and engine rotation may be slowed down until engine rotation ceases. For example, the controller may deactivate fuel injectors and spark plugs of the engine so that fuel is not injected into the cylinders and the spark plugs are not fired. In particular, cylinder combustion may be stopped at an engine position selected in order to stop the engine at the desired engine stop position. Additionally or alternatively, the electric machine may provide positive or negative torque to the engine as it spins down in order to stop the engine at the desired engine stop position. Additionally or alternatively, the CVVL mechanism may be used to influence an amount of trapped air charge in each cylinder to create compression torque in order to control the stop position.

At 812, method 800 includes applying compression release to at least the next cylinder (e.g., the next cylinder in the compression stage when the engine restarts). For example, the controller may adjust a hydraulic control valve of the hydraulic valve mechanism of the next cylinder in order to reduce an amount of cylinder pressure. As elaborated above, one of the three hydraulic valve mechanisms described with respect to FIGS. 4-6 may be used to provide compression release. As a first example, the hydraulic valve mechanism may be compression release hydraulic valve mechanism 401, and compression release may be provided via the low-lift lobe 406, which may increase an amount of valve lift in order to reduce cylinder pressure. For example, hydraulic valve 306 may be closed so that low-lift lobe 406 causes valve 312 to at least partially open, thus providing compression release. In the first example, hydraulic valve 306 may be closed when the engine shuts down or immediately following a request to restart the engine, for example. As another example, the hydraulic valve 306 may be closed just as low-lift lobe 406 begins lifting, so that low-lift lobe 406 holds valve 312 open during engine shutdown. As a second example, the hydraulic valve mechanism may be compression release hydraulic valve mechanism 501, and compression release may be provided via opening accumulator valve 502, which may increase an amount of valve lift in order to reduce cylinder pressure. In particular, valve 502 may be opened in response to the request for engine restart so that the compression release is applied when the engine restarts in order to reduce hydraulic leakage. Further, during nominal engine operation, the accumulator may be filled in order to prepare for the stop/start event. As a third example, the hydraulic valve mechanism may be compression release hydraulic valve mechanism 601, and compression release may be provided via locking valve 602, which may lock the valve 312 in a partially open position in order to reduce cylinder pressure. Specifically, if a pressure-limiting valve (e.g., such as shown in FIG. 7) is not used, locking valve 602 may be closed when valve 312 is at the desired lift during engine shut-down. However, if the pressure limiting valve 701 of FIG. 7 is included in compression release hydraulic valve mechanism 601, locking valve 602 may be closed at any point during the shut-down process during which the hydraulic pressure in the compression release hydraulic valve mechanism is above a desired valve holding pressure. Thus, using one of the three hydraulic valve mechanisms with compression release, cylinder pressure in the next cylinder may be reduced, thus reducing an amount of torque used to restart the engine, and reducing an amount of NVH generated during the stop/start event. Further, in some examples, method 800 may include applying compression release to additional cylinders at 812. For example, applying compression release to additional cylinders at 812 may further reduce an amount of torque used to restart the engine.

At 814, method 800 includes determining whether an engine restart is requested. For example, the controller may monitor engine operating conditions, such as driver demanded torque and a brake pedal position, in order to determine if vehicle movement is requested.

If the controller determines that an engine restart is not requested at 814, method 800 continues to 816 and includes maintaining the engine off. For example, the engine may not be restarted. Method 800 may then return to 814.

If the controller instead determines that an engine restart is requested at 814, method 800 continues to 818 and includes turning the crankshaft in order to begin restarting the engine. For example, an electric machine (e.g., such as electric machine 161) may be used to initiate crankshaft rotation. Due to the compression release applied at 812, an amount of torque used to restart the engine may be reduced. For example, less torque is required to compress air in at least one cylinder due to the compression release. The electric machine may rotate the crankshaft until the crankshaft reaches a threshold crankshaft rotational speed at which combustion may resume.

At 820, method 800 includes determining whether the crankshaft rotational speed exceeds the threshold crankshaft rotational speed at which combustion may resume. The threshold crankshaft rotational speed at which combustion may resume may be a pre-determined crankshaft rotational speed above which the engine is able to maintain rotation under its own power (e.g., via combustion). In some examples, the threshold crankshaft rotational speed at which combustion may resume may be determined by the controller based on engine operating conditions, such as engine temperature and a manifold air pressure. Further, in some examples, at 820, method 800 additionally or alternatively includes determining whether an angle of crankshaft rotation exceeds a threshold angle of crankshaft rotation at which combustion may resume. For example, the threshold angle of crankshaft rotation at which combustion may resume may be a pre-determined angle of crankshaft rotation above which the engine is able to maintain rotation through combustion. In some examples, the threshold angle of crankshaft rotation at which combustion may resume may be determined by the controller based on engine operating conditions, such as engine temperature and the manifold air pressure.

If the controller determines that the crankshaft rotational speed does not exceed the threshold crankshaft rotational speed at 820, method 800 may return to 818 and continue turning the crankshaft via the electric machine.

If the controller determines that the crankshaft rotational speed does exceed the threshold crankshaft rotational speed at 820, method 800 continues to 822 and includes resuming combustion in the cylinders. For example, once the crankshaft rotational speed exceeds the threshold rotational speed, an air-fuel mixture may be provided to the cylinders, and combustion may resume. As such, the electric machine may not be used to turn the engine, as expanding exhaust gas may provide torque to turn the crankshaft. Method 800 may then end.

In this way, hydraulic valve mechanisms with compression release may be used to reduce an amount of torque used to restart an engine by reducing an amount of pressure in at least one cylinder. In some examples, hydraulic valve mechanisms with compression release may be used to reduce an amount of cylinder pressure in other cylinders.

Next, FIG. 9 shows an example timeline 900 of performing compression release in a vehicle engine during a stop/start event via a CVVL mechanism that includes an integrated compression release mechanism (also referred to herein as a compression release CVVL mechanism or simply a compression release mechanism) for reducing an amount of torque used to restart the engine. For example, the engine may be engine 10 shown in FIGS. 1 and 2, and the CVVL mechanism may be any of first compression release hydraulic valve mechanism 401 of FIG. 4, second compression release hydraulic valve mechanism 501 of FIG. 5, or third compression release hydraulic valve mechanism 601 of FIG. 6. One or more or all of the engine cylinders may include the compression release hydraulic valve mechanism. Engine speed is shown in plot 902, driver-demanded torque is shown in plot 904, an indication of whether the compression release mechanism is active (e.g., compression release is being performed) or inactive (e.g., compression release is not being performed) is shown in plot 906, electric motor torque is shown in plot 908, engine fueling is shown in plot 910, and a SOC of a battery is shown in plot 912.

For all of the above, the horizontal axis represents time, with time increasing along the horizontal axis from left to right. The vertical axis of each plot represents the corresponding labeled parameter. For plots 902, 904, 908, and 912, the labeled parameter increases along the vertical axis from bottom to top. Further, plot 908 shows only positive electric motor torque, but negative electric motor torque may also be possible. For plot 906, the vertical axis shows whether the compression release mechanism is active or inactive, as labeled. For plot 910, the vertical axis shows whether the engine fueling is on (e.g., fuel is delivered to at least one cylinder of the engine) or off (e.g., fuel is not delivered to any cylinder of the engine), as labeled.

Prior to time t1, the engine is on and operating at a non-zero speed (plot 902) in order to meet a non-zero driver-demanded torque (plot 904). In particular, the driver-demanded torque (plot 904) is greater than a threshold driver-demanded torque below which the engine may be shut down for an auto-stop, indicated by a dashed line 916. Engine fueling is on (plot 910) in order to provide fuel for combustion. Further, because combustion is being performed, the compression release mechanism is inactive in every cylinder (e.g., every cylinder including the compression release mechanism) so that an air-fuel mixture is compressed within each cylinder (plot 906). As one example of maintaining the compression release mechanism inactive where the compression release CVVL mechanism includes a dual-lobe cam (e.g., first compression release hydraulic valve mechanism 401 of FIG. 4), a hydraulic control valve (e.g., hydraulic control valve 306) may be kept open when the dual-lobe cam is off of base circle at a second, lower-lift lobe during the compression stroke of the corresponding cylinder, thereby preventing the lower-lift lobe from opening a valve. As another example of maintaining the compression release mechanism inactive, an accumulator valve (e.g., accumulator valve 502 of FIG. 5) may be maintained closed so that high-pressure hydraulic fluid is not applied to the valve during the compression stroke of the corresponding cylinder. As still another example of maintaining the compression release mechanism inactive, a locking valve (e.g., locking valve 602 of FIG. 6) may be maintained open so that hydraulic pressure does not open the valve during the compression stroke of the corresponding cylinder.

Prior to time t1, the driver-demanded torque begins to decrease (plot 904) and drops below the threshold driver-demanded torque (dashed line 916) at time t1. In response, a controller (e.g., controller 12 of FIGS. 1 and 2) evaluates additional entry conditions for auto-stopping the engine for a stop/start event, including the battery SOC (plot 912). At time t1, the battery SOC (plot 912) is greater than a threshold battery SOC for inhibiting stop/start events (dashed line 918). In response, at time t2, engine fueling is discontinued (plot 910) to shut down the engine for the stop/start event. Because engine fueling is turned off, the engine no longer produces torque from combustion, and the engine speed decreases (plot 902) as it spins down to rest.

At time t3, the engine speed reaches zero (plot 902). However, in the example of FIG. 9, just prior to the engine reaching a speed of zero at time t3, the electric motor (e.g., electric machine 161 of FIG. 1) applies torque to the engine (plot 908) in order to rotate the engine to a desired position for performing the compression release. That is, the electric motor positions the engine so that a next cylinder to be in the compression stroke includes the compression release hydraulic valve mechanism when the engine is stopped. As a result, compression release will occur at least when the engine momentum is at its lowest (e.g., when the engine is at rest) during a subsequent restart. However, in other examples, the electric motor may not control the engine stop position.

Using the electric motor to apply torque to the engine decreases the battery SOC (plot 912). The battery SOC further depletes between time t3 and time t4 due to other vehicle electrical loads, such as an instrument panel, lights, and an entertainment system, but remains above the threshold battery SOC (dashed line 918).

Also at time t3, with the engine shut down for the stop/start event, the compression release mechanism of at least one cylinder is activated (plot 906) in order to decrease an amount of electric motor torque that will be used during the restart. As one example where the compression release CVVL mechanism includes the dual-lobe cam, the hydraulic control valve is closed so that the low-lift cam will open the corresponding valve during the compression stroke. As another example, the system prepares to open the accumulator valve when a restart request is received, so that high-pressure hydraulic fluid is applied to the valve during the compression stroke of the corresponding cylinder to open the valve with low lift. As still another example, the locking valve is closed so that hydraulic pressure is applied to the corresponding valve during the compression stroke of the cylinder, thereby opening the valve with low lift. For example, while compression release is active, the compression release hydraulic valve mechanism of at least one cylinder is adjusted so that the valve of the corresponding cylinder is opened during the compression stroke, reducing in-cylinder pressure during the compression stroke relative to when the valve is closed.

At time t4, the driver-demanded torque (plot 904) increases above the threshold driver-demanded torque (dashed line 914). In response, the electric motor is used to produce torque to crank the engine (plot 908), which draws power from the battery and decreases the battery SOC (plot 912). However, the battery SOC (plot 912) remains above the threshold battery SOC (dashed line 914). Because the valve of each cylinder having the compression release CVVL mechanism is open during the compression stroke due to the active compression release mechanism (plot 906), air flows out of each cylinder as a corresponding piston moves toward top dead center instead of getting compressed in the decreasing cylinder volume. As a result, the engine speed quickly increases (plot 902) while using a lower amount of electric motor torque, as will be elaborated below. At time t5, the engine speed (plot 902) reaches a threshold cranking speed indicated by a dashed line 914. Once the engine speed reaches the threshold cranking speed, the engine is spinning fast enough for combustion to maintain the momentum of the engine. Thus, at time t5, the compression release mechanism is switched to the inactive state (plot 906), and engine fueling is resumed (plot 910) so that combustion is performed in the engine.

However, if the compression release mechanism had not been used, as indicated by dashed segment 907, the magnitude and/or duration of electric motor torque used to restart the engine would have been greater, as indicated by dashed segment 909. For example, the air within each cylinder would remain trapped within the decreasing cylinder volume during the compression stroke, and the compression of the air within the cylinder would take additional torque relative to when the air is not trapped. Along with producing greater NVH, the increase electric motor torque would have further depleted the battery SOC, as shown by dashed segment 913. Because dashed segment 913 decreases below the threshold battery SOC (dashed line 918), the battery SOC would inhibit a subsequent stop/start event until after time t6, when dashed segment 913 increases above the threshold battery SOC. In contrast, by using the compression release mechanism to reduce the amount of electric motor torque used to restart the engine (plot 908), the battery SOC (plot 912) does not inhibit a subsequent stop/start event between time t5 and time t6. As a result, the engine is able to be shut down more frequently, which reduces fuel consumption and vehicle emissions.

In this way, an amount of torque used to restart an engine during a stop/start event may be reduced, which may increase an incidence of stop/start events, reduce NVH issues, and increase fuel efficiency for the engine. For example, by including a compression release hydraulic valve mechanism in at least one cylinder of an engine, compression release may be provided to at least one cylinder during a stop/start event. For example, providing compression release to at least one cylinder during engine shutdown may decrease an amount of torque used to restart the engine, as pressure in the cylinder may be decreased. In particular, because compression release reduces pressure in at least one cylinder, less torque may be used to compress the air in at least one cylinder. In some examples, only a subset of cylinders may include a compression release hydraulic valve mechanism, while in other examples, each cylinder of the engine may include a compression release hydraulic valve mechanism. By reducing an amount of torque used to restart the engine, the stop/start system may be used at a wider range of battery SOC conditions. Further, a smaller electric machine may be used, relative to systems that do not include a compression release hydraulic valve mechanism, for providing compression release during a stop/start event. By using the stop/start system more frequently, a total vehicle fuel consumption may be reduced, which may increase vehicle fuel efficiency. Further, by reducing the amount of torque used to restart the engine, an incidence of NVH may be reduced, which may increase customer satisfaction.

The technical effect of applying compression release to at least one cylinder during a stop/start event via a compression release hydraulic valve mechanism is that pressure in the at least one cylinder during engine restart may be reduced.

As an example, a method comprises: responsive to a request for a stop/start event in an engine with a continuously variable valve lift (CVVL) system including a compression release hydraulic valve actuator coupled to a valve of a first cylinder, determining a desired stop position of the engine; and prior to restarting the engine during the stop/start event, adjusting the compression release hydraulic valve actuator to open the valve before or during a compression stroke of the first cylinder. In the preceding example, the method additionally or optionally further comprises: responsive to a request to restart the engine during the stop/start event, turning a crankshaft of the engine via an electric machine; and responsive to a rotational speed of the crankshaft exceeding a threshold rotational speed, adjusting the compression release hydraulic valve actuator to not open the valve during the compression stroke of the first cylinder and resuming combustion in the engine. In one or both of the preceding examples, additionally or optionally, the desired stop position is an engine position in which the first cylinder is before or at a beginning of the compression stroke. In any or all of the preceding examples, additionally or optionally, the request for the stop/start event is responsive to an amount of driver-demanded torque decreasing below a threshold torque demand while a battery state of charge (SOC) exceeds a threshold SOC. In any or all of the preceding examples, additionally or optionally, the CVVL system includes additional compression release hydraulic valve actuators coupled to valves of additional cylinders of the engine, and the method further comprises: prior to restarting the engine during the stop/start event, adjusting the additional compression release hydraulic valve actuators to open the valves of the additional cylinders before or during the compression stroke of the corresponding additional cylinder. In any or all of the preceding examples, additionally or optionally, the compression release hydraulic valve actuator includes a cam with a first, high-lift lobe and a second, low-lift lobe, the low-lift lobe positioned to open the valve during the compression stroke of the first cylinder when a hydraulic pressure in the compression release hydraulic valve actuator exceeds a first threshold hydraulic pressure. In any or all of the preceding examples, additionally or optionally, adjusting the compression release hydraulic valve actuator to open the valve during the compression stroke of the first cylinder includes fully closing a hydraulic control valve to block flow of a hydraulic fluid out of the compression release hydraulic valve actuator. In any or all of the preceding examples, additionally or optionally, the compression release hydraulic valve actuator includes an accumulator fluidically coupled to a hydraulic cylinder of the valve via an accumulator line having an accumulator valve disposed therein, and wherein adjusting the compression release hydraulic valve actuator to open the valve during the compression stroke of the first cylinder includes increasing hydraulic pressure in the hydraulic cylinder of the valve by opening the accumulator valve. In any or all of the preceding examples, additionally or optionally, the compression release hydraulic valve actuator includes a lift-locking valve fluidically coupled between a hydraulic control valve disposed in a hydraulic supply line to the compression release hydraulic valve actuator and a hydraulic cylinder of the valve, and adjusting the compression release hydraulic valve actuator to open the valve during the compression stroke of the first cylinder includes fully closing the lift-locking valve while the valve is open.

As another example, a method comprises: during an engine auto-stop, adjusting a position of a valve of a compression release hydraulic valve mechanism coupled to a cylinder valve of a first cylinder, the cylinder valve configured to open when a hydraulic pressure in the compression release hydraulic valve mechanism at a valve piston of the cylinder valve exceeds a threshold pressure; and responsive to a request to restart the engine from the engine auto-stop, rotating a crankshaft of the engine via electric motor torque. In the preceding example, additionally or optionally, the compression release hydraulic valve mechanism includes a cam with a first, high-lift lobe positioned to open the cylinder valve during one of an intake stroke and an exhaust stroke and a second, low-lift lobe positioned to open the cylinder valve during at least the compression stroke of the first cylinder. In one or both of the preceding examples, additionally or optionally, the valve is a hydraulic control valve, and adjusting the position of the valve of the compression release hydraulic valve mechanism includes fully closing the hydraulic control valve during at least the compression stroke of the first cylinder to maintain the hydraulic pressure at the valve piston above the threshold hydraulic pressure. In any or all of the preceding examples, the method additionally or optionally further comprises, prior to shutting down the engine for the engine auto-stop, determining a desired engine stop position in which a next cylinder to enter a compression stroke is the first cylinder; and stopping the engine at the desired engine stop position. In any or all of the preceding examples, additionally or optionally, the valve is an accumulator valve positioned to control a flow of hydraulic fluid from a high pressure accumulator to the valve piston, and adjusting the position of the valve of the compression release hydraulic valve mechanism includes opening the accumulator valve to flow the hydraulic fluid from the high pressure accumulator to the valve piston to increase the hydraulic pressure above the threshold pressure. In any or all of the preceding examples, additionally or optionally, the valve is a lift-locking valve positioned between the valve piston of the cylinder valve and a hydraulic supply line, and adjusting the position of the valve of the compression release hydraulic valve mechanism includes fully closing the lift-locking valve while the hydraulic pressure in the compression release hydraulic valve mechanism the valve piston is greater than the threshold pressure.

As yet another example, a system comprises: an engine including a plurality of cylinders; an electric machine coupled to a crankshaft of the engine; a continuously variable valve lift (CVVL) system controlling intake and exhaust valves of each of the plurality of cylinders, including a first compression release hydraulic valve mechanism coupled to an intake valve of a first cylinder of the plurality of cylinders; and a controller storing executable instructions in non-transitory memory that, when executed, cause the controller to: while cranking the engine via torque from the electric machine to restart the engine from an auto-stop, open the intake valve of the first cylinder during at least a compression stroke of the first cylinder via the first compression release hydraulic valve mechanism. In the preceding example, additionally or optionally, the first compression release hydraulic valve mechanism includes a cam in contact with a cam piston and a valve piston in contact with the intake valve of the first cylinder, the cam piston positioned within a cam cylinder and the valve piston positioned within a valve cylinder, wherein the cam cylinder is fluidically coupled to the valve cylinder via an inter-cylinder line that is further fluidically coupled to a hydraulic supply line having a hydraulic control valve disposed therein. In one or both of the preceding examples, additionally or optionally, the cam includes a first, higher-lift lobe positioned to contact the cam piston during an intake stroke of the first cylinder and a second, lower-lift valve positioned to contact the cam piston during the compression stroke of the first cylinder, and wherein to open the intake valve of the first cylinder during at least the compression stroke of the first cylinder via the first compression release hydraulic valve mechanism, the controller fully closes the hydraulic control valve during at least the compression stroke of the first cylinder. In any or all of the preceding examples, additionally or optionally, the first compression release valve mechanism further includes an accumulator coupled to the inter-cylinder line via an accumulator line having an accumulator valve disposed therein, and wherein to open the intake valve of the first cylinder during at least the compression stroke of the first cylinder via the first compression release hydraulic valve mechanism, the controller fully opens the accumulator valve and fully closes the hydraulic control valve during at least the compression stroke of the first cylinder. In any or all of the preceding examples, additionally or optionally, the first compression release valve mechanism further includes a lift-locking valve positioned in the inter-cylinder line between the valve piston and a junction with the hydraulic supply line, and wherein to open the intake valve of the first cylinder during at least the compression stroke of the first cylinder via the first compression release hydraulic valve mechanism, the controller fully closes the lift-locking valve while the intake valve of the first cylinder is open. In any or all of the preceding examples, the CVVL system further includes a compression release hydraulic valve mechanism coupled to the intake valve of each remaining cylinder of the plurality of cylinders, and the controller stores further executable instructions in non-transitory memory that, when executed, cause the controller to: while cranking the engine via torque from the electric machine to restart the engine from the auto-stop, open the intake valve of each remaining cylinder of the plurality of cylinders during at least a compression stroke of the corresponding cylinder via the corresponding compression release hydraulic valve mechanism.

FIGS. 3-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
responsive to a request for a stop/start event in an engine with a continuously variable valve lift (CVVL) system including a compression release hydraulic valve actuator coupled to a valve of a first cylinder, determining a desired stop position of the engine; and
prior to restarting the engine during the stop/start event, adjusting the compression release hydraulic valve actuator to open the valve before or during a compression stroke of the first cylinder.

2. The method of claim 1, further comprising:
responsive to a request to restart the engine during the stop/start event, turning a crankshaft of the engine via an electric machine; and
responsive to a rotational speed of the crankshaft exceeding a threshold rotational speed, adjusting the compression release hydraulic valve actuator to not open the valve during the compression stroke of the first cylinder and resuming combustion in the engine.

3. The method of claim 1, wherein the desired stop position is an engine position in which the first cylinder is before or at a beginning of the compression stroke.

4. The method of claim 1, wherein the request for the stop/start event is responsive to an amount of driver-demanded torque decreasing below a threshold torque demand while a battery state of charge (SOC) exceeds a threshold SOC.

5. The method of claim 1, wherein the CVVL system includes additional compression release hydraulic valve actuators coupled to valves of additional cylinders of the engine, and the method further comprises:
prior to restarting the engine during the stop/start event, adjusting the additional compression release hydraulic valve actuators to open the valves of the additional cylinders before or during the compression stroke of the corresponding additional cylinder.

6. The method of claim 1, wherein the compression release hydraulic valve actuator includes a cam with a first, high-lift lobe and a second, low-lift lobe, the low-lift lobe positioned to open the valve before or during the compression stroke of the first cylinder when a hydraulic pressure in the compression release hydraulic valve actuator exceeds a first threshold hydraulic pressure.

7. The method of claim 6, wherein adjusting the compression release hydraulic valve actuator to open the valve before or during the compression stroke of the first cylinder includes fully closing a hydraulic control valve to block flow of a hydraulic fluid out of the compression release hydraulic valve actuator.

8. The method of claim 1, wherein the compression release hydraulic valve actuator includes an accumulator fluidically coupled to a hydraulic cylinder of the valve via an accumulator line having an accumulator valve disposed therein, and wherein adjusting the compression release hydraulic valve actuator to open the valve before or during the compression stroke of the first cylinder includes increasing hydraulic pressure in the hydraulic cylinder of the valve by opening the accumulator valve.

9. The method of claim 1, wherein the compression release hydraulic valve actuator includes a lift-locking valve fluidically coupled between a hydraulic control valve disposed in a hydraulic supply line to the compression release hydraulic valve actuator and a hydraulic cylinder of the valve, and adjusting the compression release hydraulic valve actuator to open the valve before or during the compression stroke of the first cylinder includes fully closing the lift-locking valve while the valve is open.

10. A method, comprising:
during an engine auto-stop, adjusting a position of a valve of a compression release hydraulic valve mechanism coupled to a cylinder valve of a first cylinder, the cylinder valve configured to open when a hydraulic pressure in the compression release hydraulic valve mechanism at a valve piston of the cylinder valve exceeds a threshold pressure; and
responsive to a request to restart the engine from the engine auto-stop, rotating a crankshaft of the engine via electric motor torque.

11. The method of claim 10, wherein the compression release hydraulic valve mechanism includes a cam with a first, high-lift lobe positioned to open the cylinder valve during one of an intake stroke and an exhaust stroke and a second, low-lift lobe positioned to open the cylinder valve during at least the compression stroke of the first cylinder.

12. The method of claim 11, wherein the valve is a hydraulic control valve, and adjusting the position of the valve of the compression release hydraulic valve mechanism includes fully closing the hydraulic control valve during at least the compression stroke of the first cylinder to maintain the hydraulic pressure at the valve piston above the threshold hydraulic pressure.

13. The method of claim 10, further comprising:
prior to shutting down the engine for the engine auto-stop, determining a desired engine stop position in which a next cylinder to enter a compression stroke is the first cylinder; and stopping the engine at the desired engine stop position.

14. The method of claim 10, wherein the valve is an accumulator valve positioned to control a flow of hydraulic fluid from a high pressure accumulator to the valve piston, and adjusting the position of the valve of the compression release hydraulic valve mechanism includes opening the accumulator valve to flow the hydraulic fluid from the high pressure accumulator to the valve piston to increase the hydraulic pressure above the threshold pressure.

15. A system, comprising:
an engine including a plurality of cylinders;
an electric machine coupled to a crankshaft of the engine;
a continuously variable valve lift (CVVL) system controlling intake and exhaust valves of each of the plurality of cylinders, including a first compression release hydraulic valve mechanism coupled to an intake valve of a first cylinder of the plurality of cylinders; and
a controller storing executable instructions in non-transitory memory that, when executed, cause the controller to:
while cranking the engine via torque from the electric machine to restart the engine from an auto-stop, open the intake valve of the first cylinder during at least a compression stroke of the first cylinder via the first compression release hydraulic valve mechanism.

16. The system of claim 15, wherein the first compression release hydraulic valve mechanism includes a cam in contact with a cam piston and a valve piston in contact with the intake valve of the first cylinder, the cam piston positioned within a cam cylinder and the valve piston positioned within a valve cylinder, wherein the cam cylinder is fluidically coupled to the valve cylinder via an inter-cylinder line that is further fluidically coupled to a hydraulic supply line having a hydraulic control valve disposed therein.

17. The system of claim 16, wherein the cam includes a first, higher-lift lobe positioned to contact the cam piston during an intake stroke of the first cylinder and a second, lower-lift valve positioned to contact the cam piston during the compression stroke of the first cylinder, and wherein to open the intake valve of the first cylinder during at least the compression stroke of the first cylinder via the first compression release hydraulic valve mechanism, the controller fully closes the hydraulic control valve during at least the compression stroke of the first cylinder.

18. The system of claim 16, wherein the first compression release valve mechanism further includes an accumulator coupled to the inter-cylinder line via an accumulator line having an accumulator valve disposed therein, and wherein to open the intake valve of the first cylinder during at least the compression stroke of the first cylinder via the first compression release hydraulic valve mechanism, the controller fully opens the accumulator valve and fully closes the hydraulic control valve during at least the compression stroke of the first cylinder.

19. The system of claim 16, wherein the first compression release valve mechanism further includes a lift-locking valve positioned in the inter-cylinder line between the valve piston and a junction with the hydraulic supply line, and wherein to open the intake valve of the first cylinder during at least the compression stroke of the first cylinder via the first compression release hydraulic valve mechanism, the controller fully closes the lift-locking valve while the intake valve of the first cylinder is open.

20. The system of claim 15, wherein the CVVL system further includes a compression release hydraulic valve mechanism coupled to the intake valve of each remaining cylinder of the plurality of cylinders, and the controller stores further executable instructions in non-transitory memory that, when executed, cause the controller to:
while cranking the engine via torque from the electric machine to restart the engine from the auto-stop, open the intake valve of each remaining cylinder of the plurality of cylinders during at least a compression stroke of the corresponding cylinder via the corresponding compression release hydraulic valve mechanism.

* * * * *